(12) United States Patent
Dew et al.

(10) Patent No.: US 9,887,529 B2
(45) Date of Patent: Feb. 6, 2018

(54) SPLICED SHIELDED WIRE CABLE

(71) Applicant: DELPHI TECHNOLOGIES, INC., Troy, MI (US)

(72) Inventors: Brian K. Dew, Canfield, OH (US); Bruce D. Taylor, Cortland, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/225,888

(22) Filed: Aug. 2, 2016

(65) Prior Publication Data

US 2016/0344176 A1 Nov. 24, 2016

Related U.S. Application Data

(62) Division of application No. 14/274,857, filed on May 12, 2014.

(51) Int. Cl.
| | | |
|---|---|---|
| *H01R 4/00* | (2006.01) | |
| *H02G 3/06* | (2006.01) | |
| *H02G 15/08* | (2006.01) | |
| *H02G 15/18* | (2006.01) | |
| *B60R 16/02* | (2006.01) | |
| *H01B 7/00* | (2006.01) | |

(52) U.S. Cl.
CPC ..... *H02G 15/1806* (2013.01); *B60R 16/0222* (2013.01); *H01B 7/0045* (2013.01); *Y10T 29/49194* (2015.01)

(58) Field of Classification Search
CPC .. H02G 15/1806; H01B 7/0045; H01B 15/18; H01B 15/1813; H01B 15/184
USPC ............................................ 174/84 R, 88 R
See application file for complete search history.

(56) References Cited

U.S. PATENT DOCUMENTS

| | | | |
|---|---|---|---|
| 2,640,095 A | 5/1953 | Lewis | |
| 2,768,105 A | 10/1956 | Dittmore | |
| 2,937,228 A | 5/1960 | Robinson | |
| 3,001,003 A | 9/1961 | Robinson | |
| 3,151,211 A | 9/1964 | Reid | |
| 3,240,868 A | 3/1966 | Jenkins | |
| 4,831,214 A * | 5/1989 | Wilck | H02G 15/1806 174/73.1 |
| 4,832,248 A | 5/1989 | Soni et al. | |
| 5,028,742 A | 7/1991 | Redman | |

(Continued)

FOREIGN PATENT DOCUMENTS

| | | | | |
|---|---|---|---|---|
| GB | 2164805 A * | 3/1986 | ........... | H02G 15/068 |
| WO | 2014070851 A1 | 5/2014 | | |

OTHER PUBLICATIONS

Hajek (GB2164805A) provided with Office Action.*

(Continued)

*Primary Examiner* — Chau N Nguyen
*Assistant Examiner* — Roshn Varghese
(74) *Attorney, Agent, or Firm* — Robert J. Myers

(57) ABSTRACT

A wire harness having at least wire harness assembly having a splice of at least three shielded wire cables is presented. The assembly includes a flexible insulation layer wrapped about the joined core conductors of the three cables, a flexible conductive layer wrapped about the shield conductors of the cables, and a section of dual wall heat shrink tubing enclosing the flexible conductive layer and portions of the insulative jackets of the cables. The flexible conductive layer does not include any solder.

4 Claims, 20 Drawing Sheets

(56) References Cited

U.S. PATENT DOCUMENTS

| | | | |
|---|---|---|---|
| 5,804,767 A | 9/1998 | Winfield et al. | |
| 5,854,444 A | 12/1998 | Fehlhaber | |
| 8,415,564 B2 | 4/2013 | Seraj et al. | |
| 8,445,783 B2 | 5/2013 | Taylor et al. | |
| 2002/0046865 A1* | 4/2002 | Bertini | H01R 4/70 174/84 R |

OTHER PUBLICATIONS

Tyco Electronics Catalog 165402, pp. 8-62 to 8-65, Tyco Electronics Corporation, Revised Dec. 2004.

Installation Procedure for TE Conductivity Shielded Cable Splice Kits with Mini-Seal Crimp Primary Splices RCPS-150-02 Rev. D, TE Connectivity Corporation, Jul. 13, 2013.

Installation Procedure for Coaxial Cable Splice Kit B-202-81 and B-202-82 RPIP-699-00 Rev. B, Tyco Electronics Corporation, Aug. 7, 2007.

Robert Goodman, et al.: "Power Cable Splicing & Terminating edited by",Dec. 31, 2008 (Dec. 31, 2008) XP055202327, Retrieved from the Internet: URL:http://multimedia.3m.com/mws/media/411030/high-voltagepower-cable-splicing-terminating-brief.PDF [retrieved on Jul. 14, 2015].

Alpha Wire: "Heat-Shrink Tubing: The Versatile Tools for Maintenance and Repair",Dec. 31, 2009 (Dec. 31, 2009), XP055335959, Retrieved from the Internet: URL:http://www.newark.com/pdfs/techarticles/alphaWire/HeatShrinkTubing.pdf [retrieved on Jan. 17, 2017].

* cited by examiner

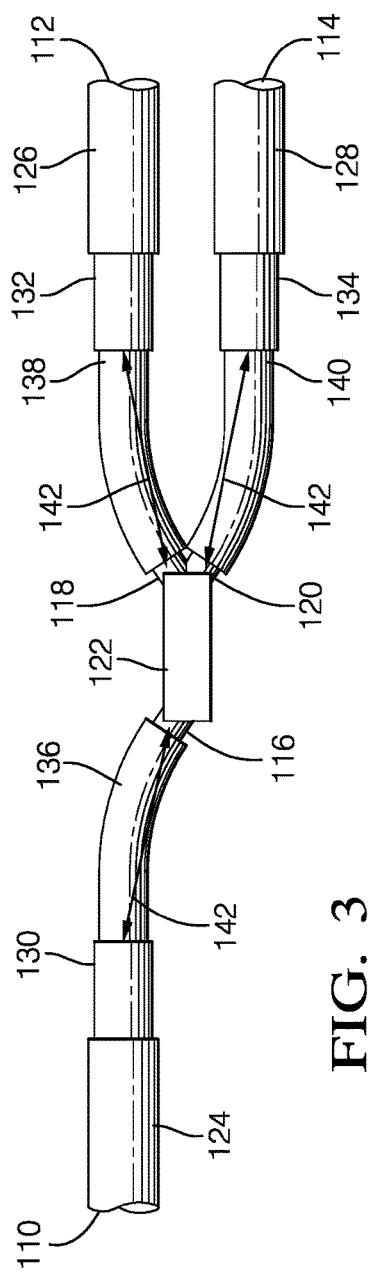
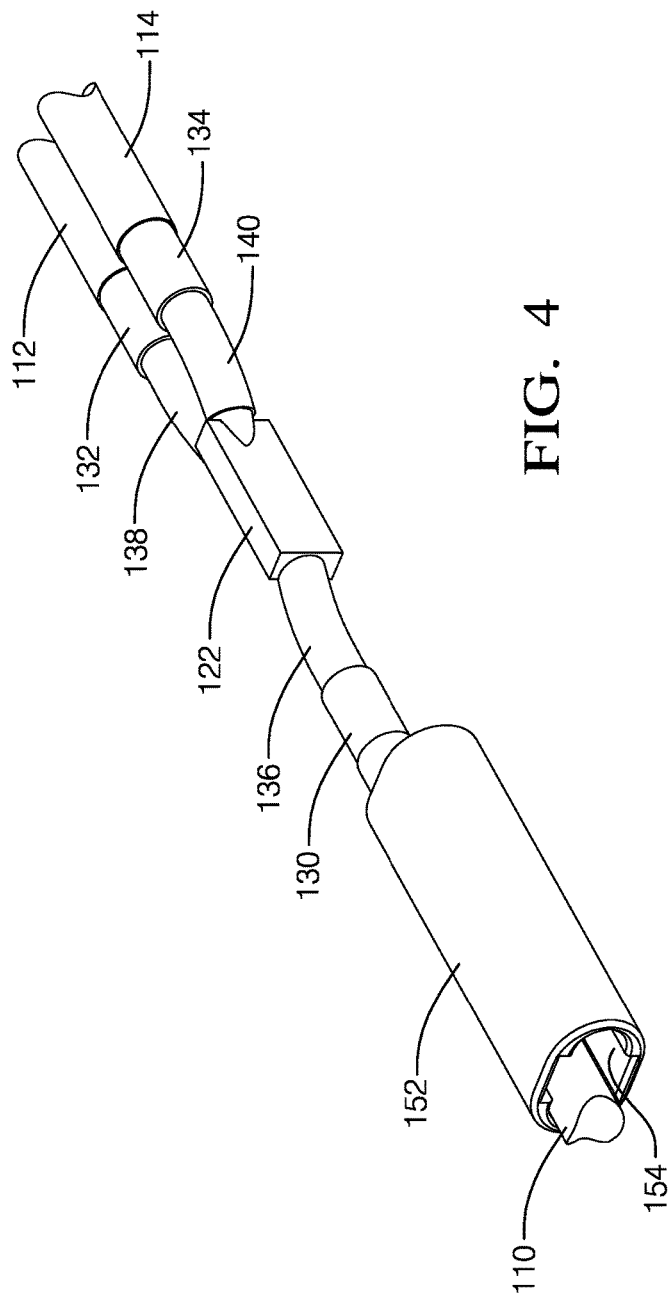
FIG. 3
FIG. 4

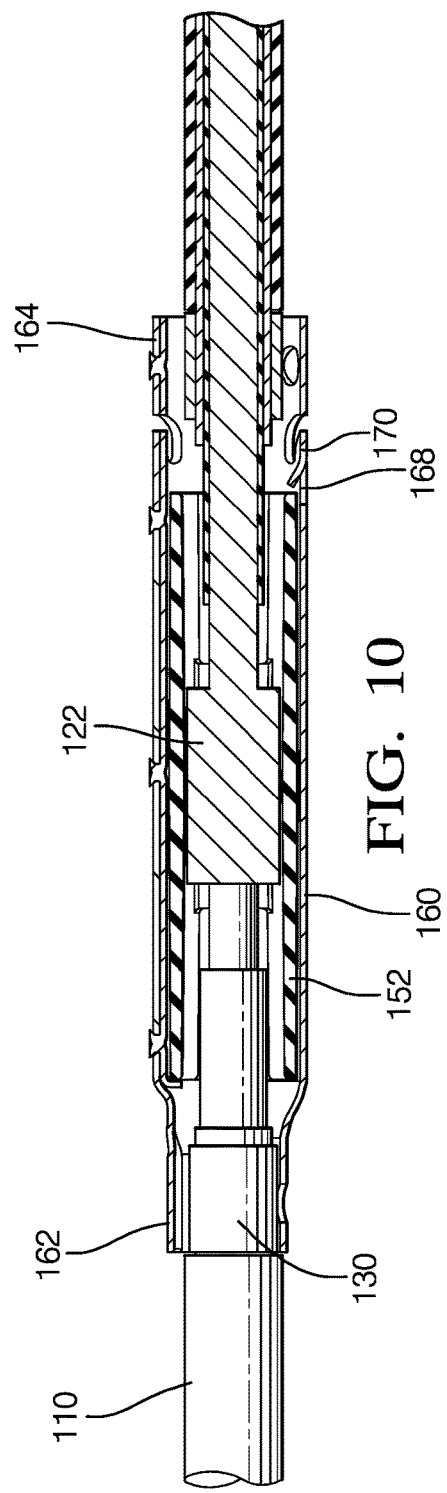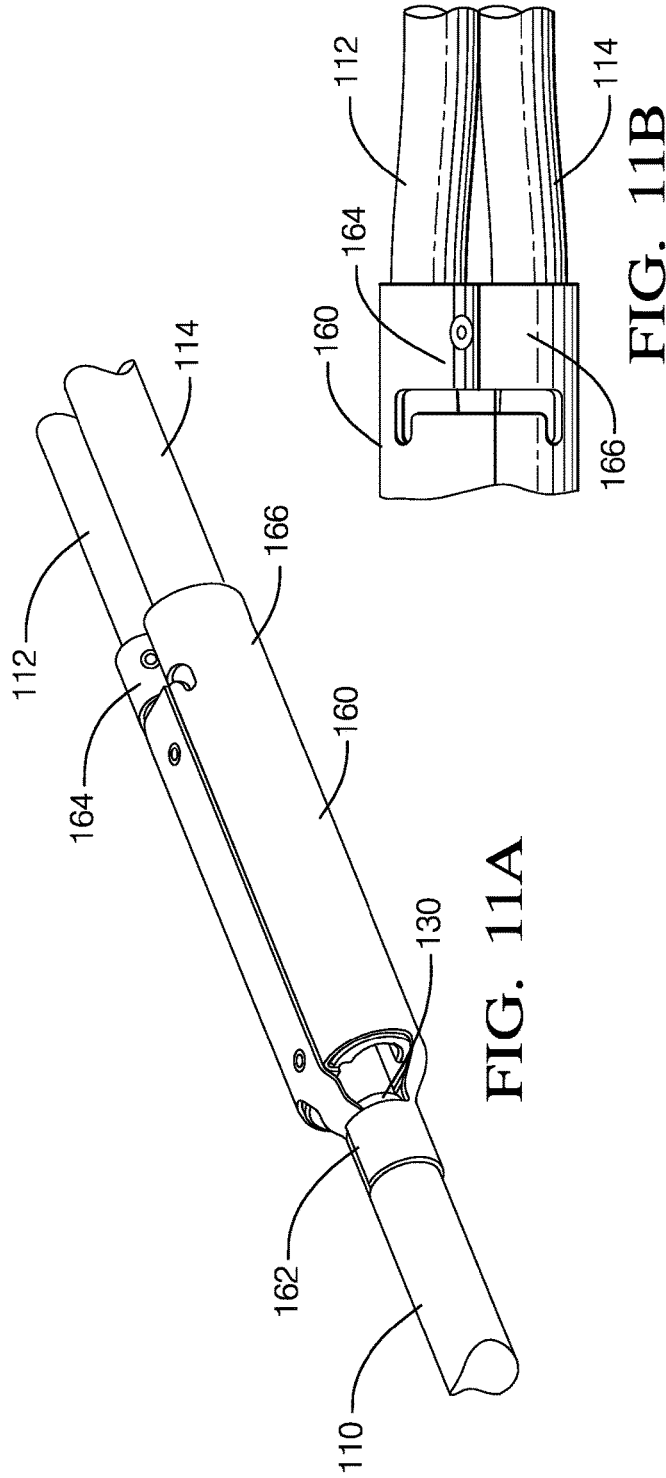

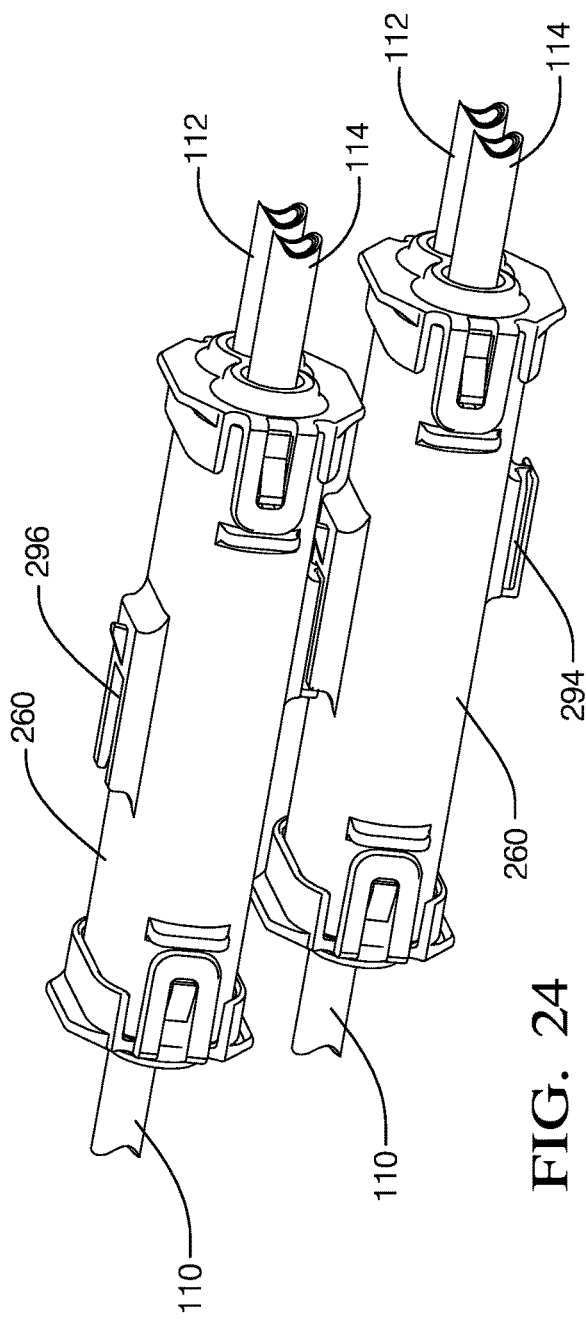
FIG. 24
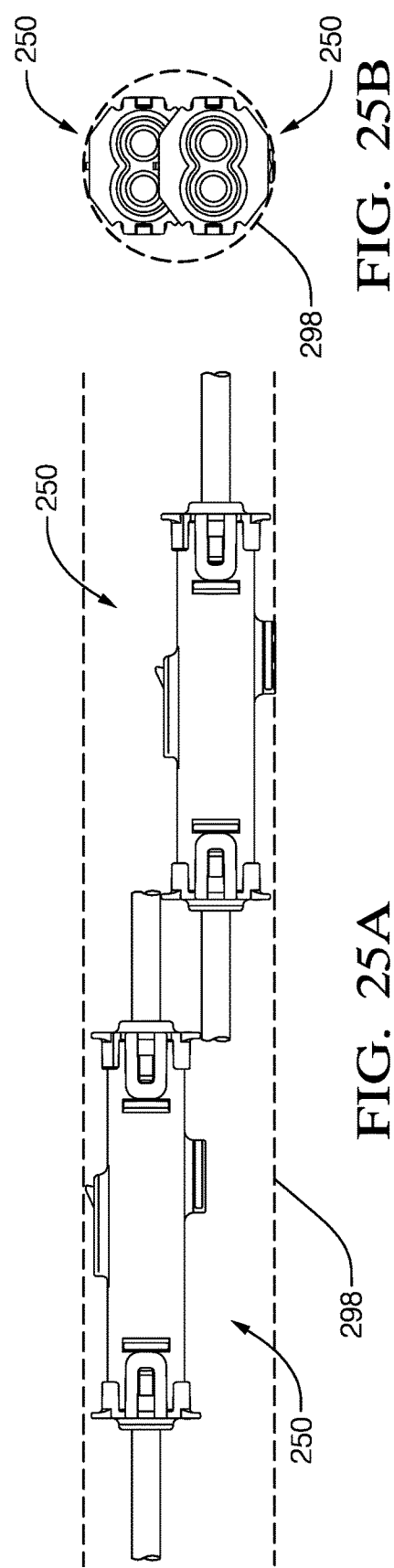
FIG. 25A
FIG. 25B

SPLICED SHIELDED WIRE CABLE

CROSS-REFERENCE TO RELATED APPLICATION

This application is a divisional application of U.S. patent application Ser. No. 14/274,857, filed May 12, 2014, the entire disclosure of which is hereby incorporated herein by reference.

TECHNICAL FIELD OF THE INVENTION

The invention generally relates to a method for splicing shielded wire cables and the spliced wire cables produced by this method.

BACKGROUND OF THE INVENTION

Shielded wire cables typically include an insulated core conductor and a separate insulated shield conductor surrounding the core conductor insulation. The shield conductor may consist of a braided wire mesh, metal foil, or metalized film. The cables typically have a second insulation layer covering the shield conductor. Shielded wire cables have been long used for communications systems, such as in cable television transmission lines. Shielded wire cables are also finding use in high voltage applications in electric and hybrid electric vehicles. When shielded wire cables are spliced together, there is usually a need to electrically connect the shield conductors of the spliced cables as well as the core conductor, in order to maintain electrical continuity of the shield conductors. Interconnecting the shield conductors may be complicated because the shield conductors must be cut back from the spliced ends of the cable in order to join the core conductors. Interconnecting the shield conductors may be further complicated in a one-to-many splicing configuration, sometimes referred to as a Y-splice.

A prior art method splicing shielded wire cables involved joining the center conductors of the cables using a crimping connection, covering the crimped joint with an insulator, such as heat shrinkable tubing and then covering the exposed shield conductors and insulated joint with a flux coated solder impregnated conductive sleeve within a section of heat shrinkable tubing. Such a solder impregnated conductive sleeve within a section of heat shrinkable tubing is available from TE Connectivity Corporation of Menlo Park Calif. (formerly Tyco Corporation) under the brand name SolderShield.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with a first embodiment and second embodiment of this invention, a wire harness assembly is provided. The wire harness assembly includes a first shielded wire cable having a first core conductor at least partially axially surrounded by a first shield conductor which is at least partially axially surrounded by a first insulative jacket, a second shielded wire cable having a second core conductor at least partially axially surrounded by a second shield conductor which is at least partially axially surrounded by a second insulative jacket, and a third shielded wire cable having a third core conductor at least partially axially surrounded by a third shield conductor which is at least partially axially surrounded by a third insulative jacket, wherein the first, second and third core conductors form a directly joined portion and the first, second, and third shield conductors are physically separated one from another. The wire harness assembly also includes a conductive sleeve defining a longitudinal axis and a first axial passage enclosing a portion of the first, second, and third shield conductors and defining a first contact attached to the first shield conductor, a second contact attached to the second shield conductor, and a third contact attached to the third shield conductor, wherein the first, second, and third insulative jackets are separated one from another and wherein enclosed portions of the of the first, second, and third shield conductors are substantially parallel to the longitudinal axis. The wire cable assembly further includes an outer insulator sealably engaging the first, second, and third insulative jackets and enclosing the conductive sleeve.

The wire harness assembly may include an inner insulator disposed within the first axial passage and defining a second axial passage enclosing the joined portion of the first, second, and third core conductors. The inner insulator and the sleeve may have a generally elliptical cross section. A portion of the second axial passage may be narrowed such that only a single shielded cable may be disposed within the portion of the second axial passage. The sleeve may define a crimping wing configured to form the first contact and the sleeve may define a U-shaped slot configured to form the second and third contact. The first, second, and third contact may each define a hole configured to allow the injection of solder paste into the interior of the first, second, and third contacts. The wire harness assembly may further include a plurality of ferrules attached to each of the first, second, and third shield conductors, wherein the first, second and third contacts are attached to at least one of the plurality of ferrules. At least one ferrule in the plurality of ferrules may be formed of solder.

The first, second, and third contact may be attached to the first, second, and third outer conductor respectively by a plurality of ferrules. The sleeve may include a first sleeve portion configured to be joined to a second sleeve portion and the inner insulator may include a first inner insulator portion configured to be joined to a second inner insulator portion.

A method of splicing shielded wire cables in accordance with the first or second embodiment of this invention is provided. The method includes the steps of providing a first shielded wire cable having a first core conductor at least partially axially surrounded by a first shield conductor which is at least partially axially surrounded by a first insulative jacket, providing a second shielded wire cable having a second core conductor at least partially axially surrounded by a second shield conductor which is at least partially axially surrounded by a second insulative jacket, providing a third shielded wire cable having a third core conductor at least partially axially surrounded by a third shield conductor which is at least partially axially surrounded by a third insulative jacket, providing a shield defining a longitudinal axis, a first axial passage, and a first, second, and third contact, said shield formed of a conductive material, and providing an inner insulator defining a second axial passage, said inner insulator formed of a dielectric material. The method also includes the steps of joining the first core conductor to the second core conductor and the third core conductor, disposing the joined first, second, and third core conductors within the second axial passage, disposing the inner insulator and the first, second, and third shield conductors within the first axial passage, wherein the portions of the of the first, second, and third shield conductors disposed within the inner insulator are substantially parallel to the longitudinal axis, and separating the first, second, and third insulative jackets one from another. The method further includes the steps of attaching the first contact to the first shield conductor, the second contact to the second shield conductor, and the third contact to the third shield conductor, thereby providing a conductive path between the first, second, and third shield conductors, providing an outer insulator formed of a nonconductive material, disposing the shield within the outer insulator, and sealably engaging the outer insulator to the first, second, and third insulative jackets, thereby enclosing the shield within the outer insulator. The joined first, second, and third core conductors may be slideably disposed within the second axial passage and the first, second, and third shield conductors may be slidably disposed within the first axial passage.

Where the first, second, and third contact each define a hole, the method may include the steps of injecting solder paste into the interior of the first, second, and third contacts through the holes defined therein and heating the solder paste until it reflows, thereby soldering the first, second, and third contacts to the first, second, and third shield conductors respectively. The method may optionally include the steps of providing a first, second, and third ferrule; attaching the first, second, and third ferrule to the first, second, and third shield conductors respectively, crimping the first, second, and third ferrule to the first, second, and third contacts respectively, thereby attaching the first, second, and third contacts to the first, second, and third shield conductors respectively.

Where the sleeve includes a first sleeve portion and a second sleeve portion, the method may additionally include the step of joining the first sleeve portion to the second sleeve portion, thereby disposing the joined first, second, and third core conductors within the second axial passage.

Where the inner insulator includes a first inner insulator portion and a second inner insulator portion, the method may further include the step of joining the first inner insulator portion to the second inner insulator portion, thereby disposing the inner insulator and the first, second, and third shield conductors within the first axial passage.

Where the outer insulator further includes an end cap configured to sealably engage the outer insulator and at least one shielded wire cable, the method may also include the steps of sealably engaging the end cap with the at least one shielded wire cable and sealably engaging the end cap with the outer insulator, thereby enclosing the shield within the outer insulator.

Another method of splicing shielded wire cables in accordance with a third embodiment of this invention is provided. The method includes the steps of providing a first, second, and third shielded wire cable each having a core conductor at least partially axially surrounded by a shield conductor which is at least partially axially surrounded by an insulative jacket, providing a flexible insulation layer, providing a flexible conductive layer, and providing a section of dual wall heat shrink tubing. The method also includes the steps of wrapping a first portion of the flexible insulation layer about the joined first, second, and third core conductors, wrapping the flexible conductive layer about the first, second, and third shield conductors, and disposing the flexible conductive layer and portions of the first, second, and third insulative jacket within the section of dual wall heat shrink tubing.

This method may further include the steps of wrapping a second portion of the flexible insulative layer about the first portion of the flexible insulative layer, wrapping a third portion of the flexible insulative layer about a portion of the insulative layer of the first shielded wire cable and a first portion of the flexible conductive layer, wrapping a fourth portion of the flexible insulative layer about a portion of the insulative layer of the second and third shielded wire cables and a second portion of the flexible conductive layer, providing a first and second ferrule, wrapping the first ferrule about the insulative layer of the second shielded wire cable, and wrapping the second ferrule about the insulative layer of the third shielded wire cable adjacent the first ferrule. The first and second ferrule may be disposed within the section of dual wall heat shrink tubing.

The first portion of the flexible insulative layer may be formed of a cloth tape. The second, third, and fourth portions of the flexible insulative layers may be formed of a section of heat shrink tubing. The fourth portion of the flexible insulative layer may have a larger diameter than the third portion of the flexible insulative layer prior to shrinking. The first and second ferrules may also be formed of a section of heat shrink tubing.

In accordance with the third embodiment of this invention, a wire harness assembly having a splice of at least three shielded wire cables is provided. The wiring harness includes a first shielded wire cable having a first core conductor at least partially axially surrounded by a first shield conductor which is at least partially axially surrounded by a first insulative jacket; a first, second, and third shielded wire cable each having a core conductor at least partially axially surrounded by a shield conductor which is at least partially axially surrounded by an insulative jacket, wherein the first core conductor is electrically and mechanically coupled to the second core conductor and the third core conductor. The wire harness assembly further includes a first flexible insulation layer wrapped about the joined first, second, and third core conductors, a flexible conductive layer wrapped about the first, second, and third shield conductors, and a section of dual wall heat shrink tubing in which the third and fourth flexible insulative layers and portions of the first, second, and third insulative jacket are disposed. The flexible conductive layer does not include solder.

The wire harness assembly may further include a second flexible insulative layer wrapped about the first insulative layer, a third flexible insulative layer wrapped about a portion of the insulative layer of the first shielded wire cable and a first portion of the flexible conductive layer, a fourth flexible insulative layer wrapped about a portion of the insulative layer of the second and third shielded wire cables and a second portion of the flexible conductive layer, a first ferrule wrapped about the insulative layer of the second shielded wire cable, and a second ferrule wrapped about the insulative layer of the third shielded wire cable and adjacent the first ferrule, wherein the first and second ferrules are also disposed within the section of dual wall heat shrink tubing.

The first insulative layer may be formed of a cloth tape and the flexible conductive layer is formed of braided strands.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which:

FIG. 3 is an illustration of a wire harness assembly having a core conductor splice connection in accordance with the first embodiment;

FIG. 4 is a perspective view of a wire harness assembly having an inner insulator pre-loaded on a shielded wire cable in accordance with the first embodiment;

FIG. 10 is a cut-away view of the shield of the wire harness assembly of FIG. 9 enclosing the inner insulator in accordance with the first embodiment;

FIG. 11A is a perspective view of crimping a contact of the wire harness assembly of FIG. 10 to a shield conductor in accordance with the first embodiment;

FIG. 11B is a close up top view of the crimped contact of the wire harness assembly of FIG. 11A in accordance with the first embodiment;

FIG. 24 is a perspective view of the outer insulator of the wiring harness assembly connected to another outer insulator of another wiring harness assembly in accordance with the second embodiment; and FIG. 25A is a side view of two wiring harness assemblies disposed within a wiring conduit in accordance with the second embodiment;

FIG. 25B is an end view of two wiring harness assemblies disposed within a wiring conduit in accordance with the second embodiment;

DETAILED DESCRIPTION OF THE INVENTION

Described herein are devices and a methods for splicing two or more shielded wire cables. The devices and methods may be used to splice shielded wire cables with a single core conductor or multiple core connectors. The devices and methods described herein may be used to splice together two shield wire cables, for example to repair a cut cable. The devices and methods described herein may also be used to splice one shielded wire cable to two or more shielded wire cables to form a Y-splice. The devices and methods described herein may be used for splicing a variety of shielded wire cables types, for example shielded wire cables for communication transmissions, such as RG-59 cable, or high voltage shielded wire cables designed for electrical or hybrid electrical vehicles.

Figure 1:
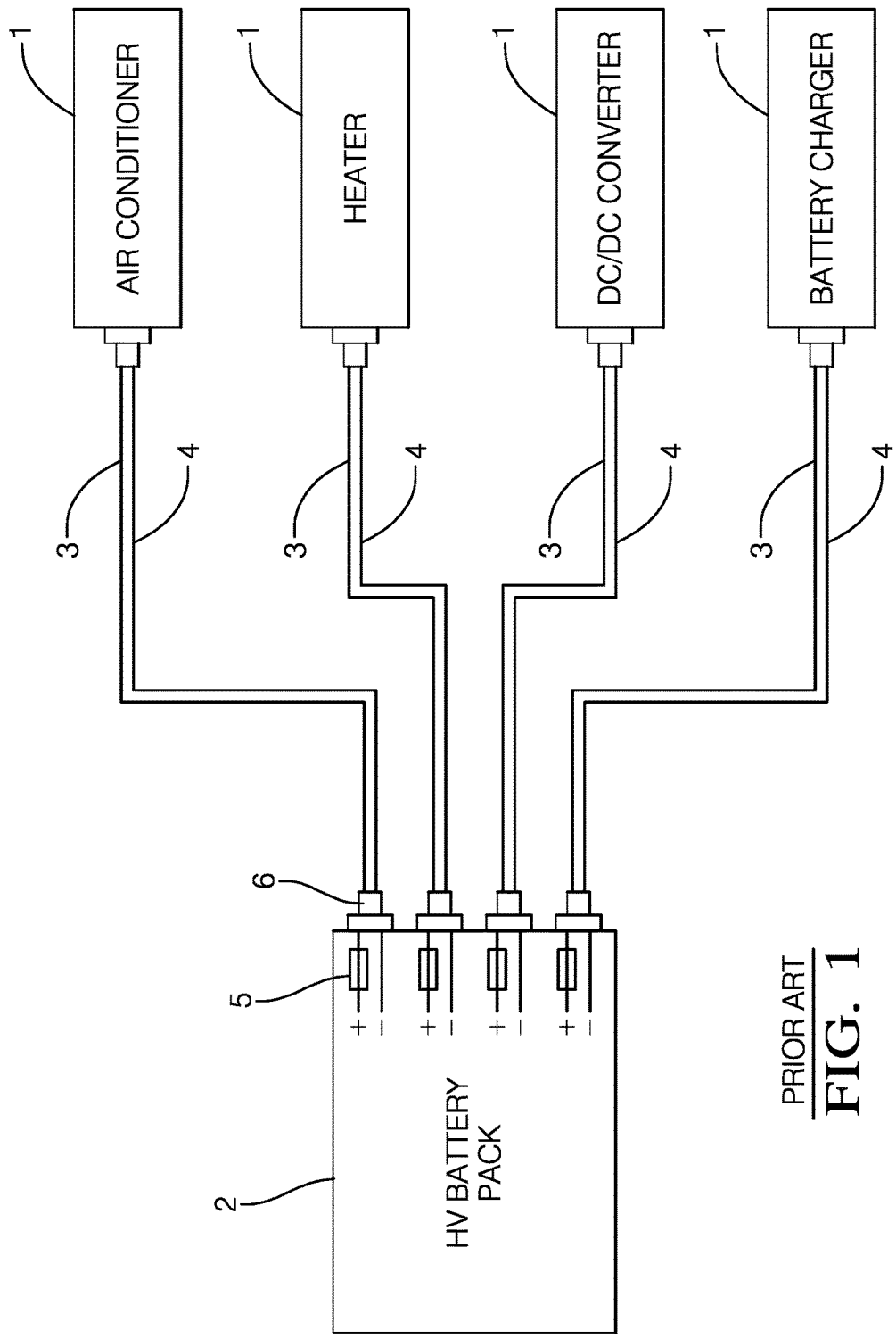
FIG. 1 is a schematic diagram of a prior art electrical load connection scheme.

FIG. 1 illustrates a prior art scheme for connecting electrical loads 1 to a battery pack 2, such as in an electric vehicle. Each electrical load 1 requires a pair of high voltage shielded wire cables (positive 3 and negative 4 polarity) running from the battery pack 2 to the electrical load 1 and a separate fuse 5 protecting each of the circuits.

Figure 2:
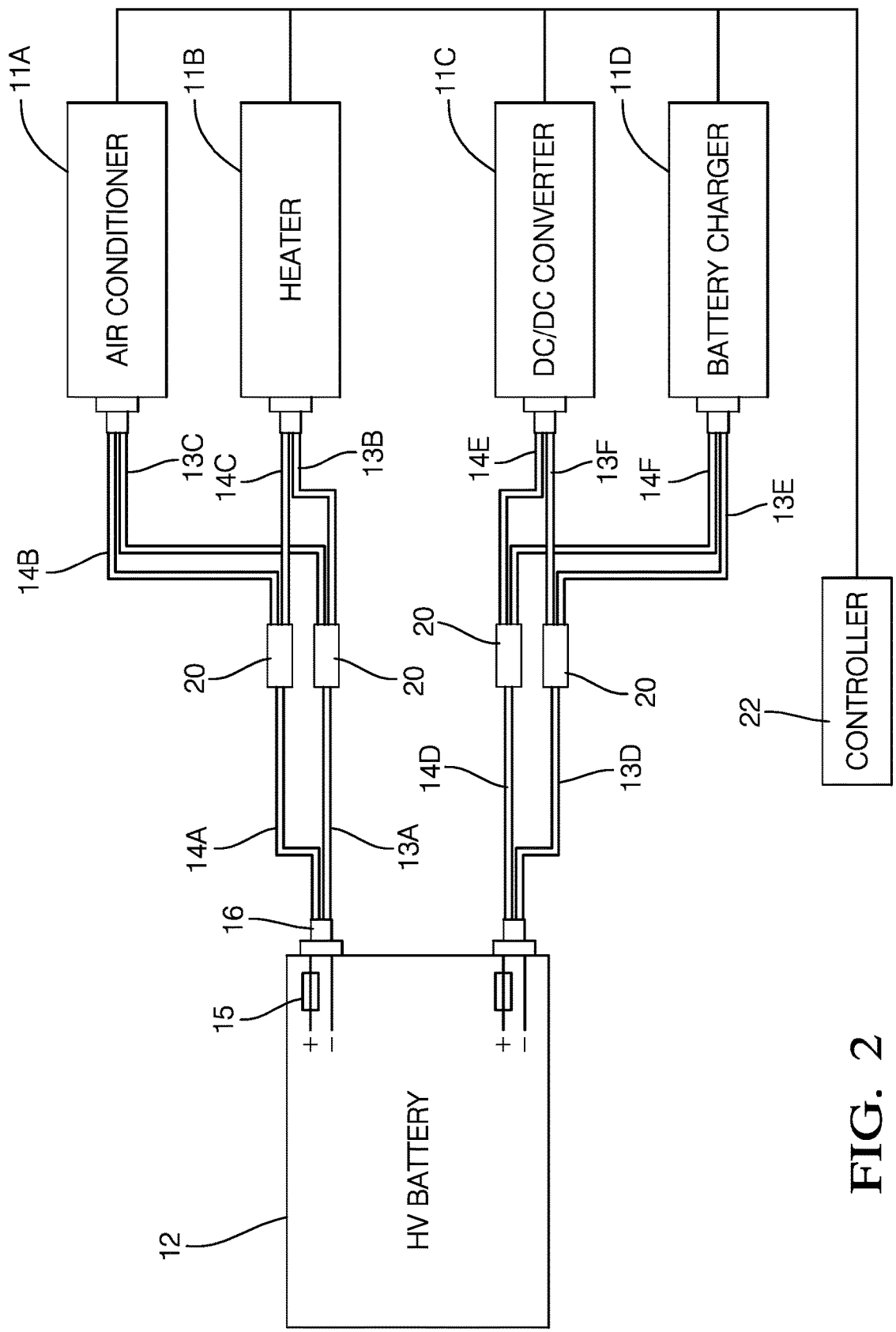
FIG. 2 is a schematic diagram of an electrical load connection scheme in accordance with a first and second embodiment.

FIG. 2 illustrates a non-limiting example of a scheme for connecting electrical loads 11 to a battery pack 12, such as in an electric vehicle by splicing together a pair of positive cables 13 and a pair of negative cables 14 using the devices and methods presented herein. The inventors discovered that several circuits may be combined and share a single fuse 15, for example because the electrical loads 11 are not used concurrently. The electrical loads 11 may also be connected to a controller 22 that enables the electrical loads 11 to operate one at a time so that they are not used concurrently or the controller may monitor the current used by each of the electrical loads 11 and control each of the electrical loads 11 so that the total current used by the electrical loads 11 is less than the current rating required to blow, or open, the fuse 15. The inventors realized that a pair of high voltage shielded wire cables 13, 14 to these electrical loads 1 could be spliced together as shown in FIG. 2 with a shielded cable splice device 20, hereinafter device 20, that connects the core conductors 17 of the shielded wire cables 13, 14 while maintaining isolation and continuity of the shield conductors (not shown) of the shielded wire cables 13, 14, thereby reducing the length of shielded wire cable 13, 14 required to interconnect the electrical loads 11 to the battery pack 12, thus reducing shielded wire cable 13, 14 cost, weight, packaging space, and wire routing complexity for the wiring harness. Because multiple electrical loads 11 can share a single fuse 15, The number of fused circuits in the battery pack 12 could also be reduced; further reducing cost and complexity of the battery pack 12 by reducing the number of fuses 15 and cable connectors 16 compared with the prior art scheme of FIG. 1.

FIG. 3 illustrates a non-limiting example of three high voltage shielded wire cables a first shielded cable 110, a second shielded cable 112, and a third shielded cable 114 that have been spliced together. A core conductor 116, 118, 120 of each of the shielded cables 110, 112, 114 has been joined by a sonic welding process to form a connection 122. Portions of the outer insulation layers 124, 126, 128, shield conductors 130, 132, 134, and inner insulation layers 136, 138, 140 have been removed from the core conductors 116, 118, 120 prior forming the connection 122. Alternatively, other processes well known to those skilled in the art, such as soldering or crimping the conductors within a conductive sleeve may be used to form the connection 122. An additional portion of each of the shield conductors 130, 132, 134 may be removed or cut way to provide adequate voltage creepage distance 142 to prevent a leakage current between the core conductors 116, 118, 120 and the shield conductors 130, 132, 134, thereby exposing the inner insulation layers 136, 138, 140 of the shielded cables 110, 112, 114. Additionally, conductive ferrules 144, 146, 148 may be mechanically and electrically attached to the shield conductors 130, 132, 134 to provide a more durable electrical connection to the shield conductors 130, 132, 134. The ferrules may be a closed or barrel-type ferrule that is attached to the shield conductors by crimping or soldering prior to forming the connection 122 or the ferrules may be an open or clip-type ferrule that can be attached to the shield conductors by crimping after forming the connection 122. The ferrules may be formed of a solder material that is heated, for example by induction heating, until the ferrules reflow and join the contacts to the shield conductors. The ferrules may comprise an inner ferrule that is disposed between the shield conductor and the inner insulation layer and an outer ferrule that is disposed over the shield conductor. Materials and methods used to attach the conductive ferrules 144, 146, 148 to the shield conductors 130, 132, 134 are well known to those skilled in the art.

FIGS. 4 through 15 illustrate a non-limiting example of a process of forming a shielded cable assembly 150 having both the core conductors 116, 118, 120 and the shield conductors 130, 132, 134 of three shielded wire cables 110, 112, 114 spliced together according to a first embodiment. The embodiment illustrated here is configured to splice three shielded wire cables 110, 112, 114 together in a Y-splice configuration. However, alternative embodiments may be envisioned that are configured to splice just two shielded wire cables or splice more than three shielded wire cables.

As illustrated in FIG. 4, the wire cable assembly 150 includes an inner insulator 152 formed of dielectric material. The dielectric material may be a polymer material, such as glass-filled polyamide (commonly known by the trade name NYLON) or polybutylene terephthalate (PBT). The inner insulator 152 may be formed using an injection molding process or other plastic forming processes well known to those skilled in the art. The inner insulator 152 is designed to enclose the exposed portion of the connection 122 and a portion of the exposed inner insulation layers 136, 138, 140 of the shielded cables 110, 112, 114.

Figure 5:
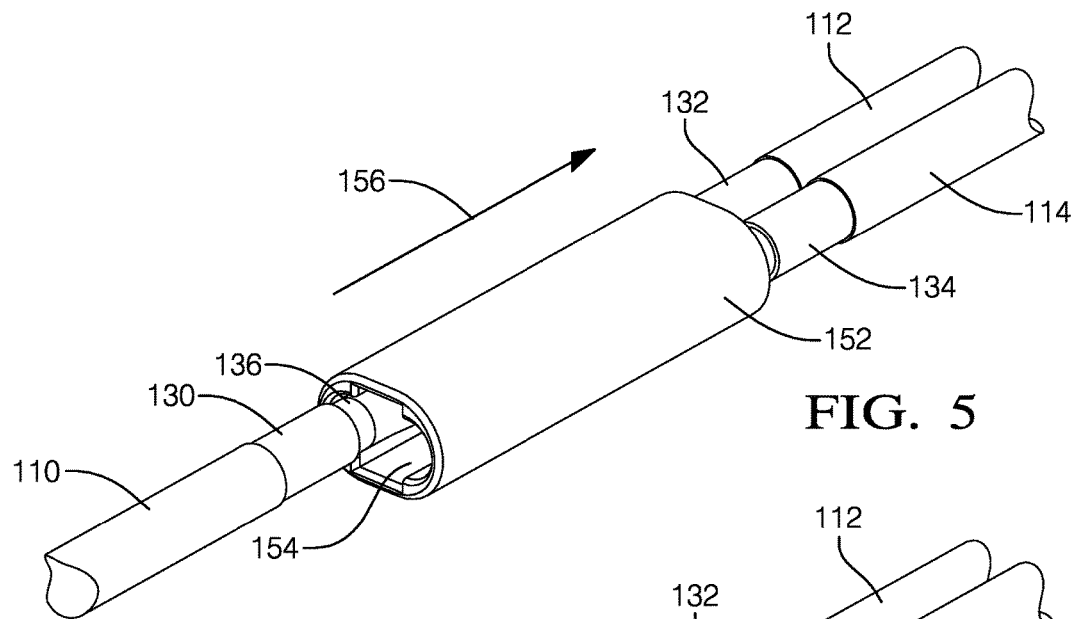
FIG. 5 is a perspective view of a wire harness assembly having the inner insulator enclosing the core conductor splice connection in accordance with the first embodiment.
Figure 6:
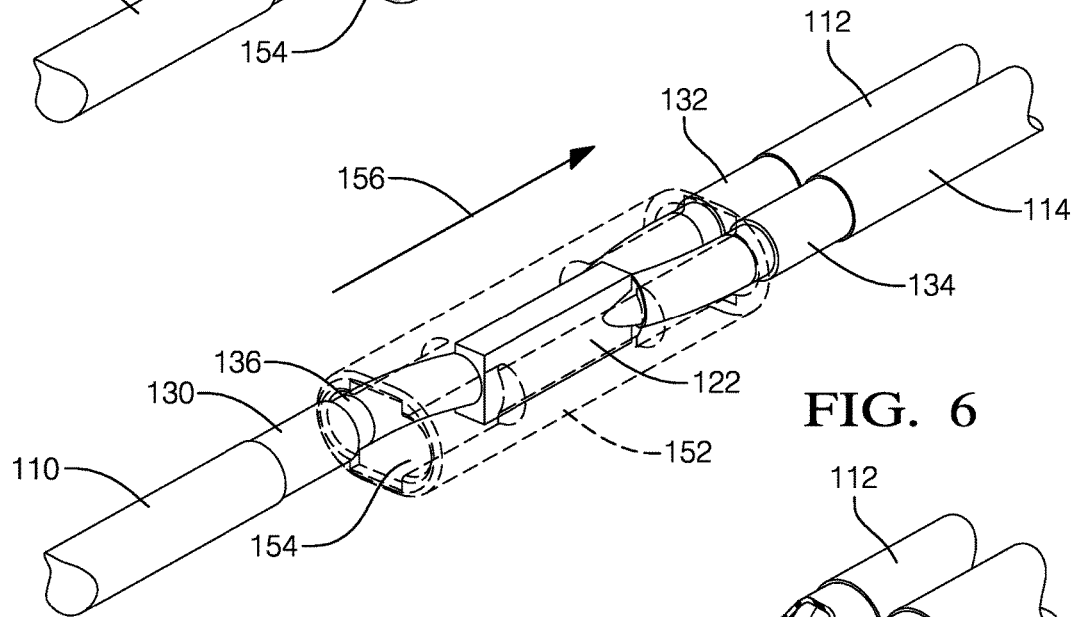
FIG. 6 is semi-transparent perspective view of the inner insulator of the wire harness assembly of FIG. 5 enclosing the core conductor splice connection in accordance with the first embodiment.

The inner insulator 152 defines an axial passage 154, hereafter referred to as a channel 154 that is designed to accommodate the connection 122 and the joined shielded wire cables 110, 112, 114. As shown in FIGS. 5 and 6, the inner insulator 152 may then be slid over the single shielded cable 110 along the longitudinal axis A in the direction 156 over the connection 122, leaving the shield conductors 130, 132, 134 exposed.

Figure 7:
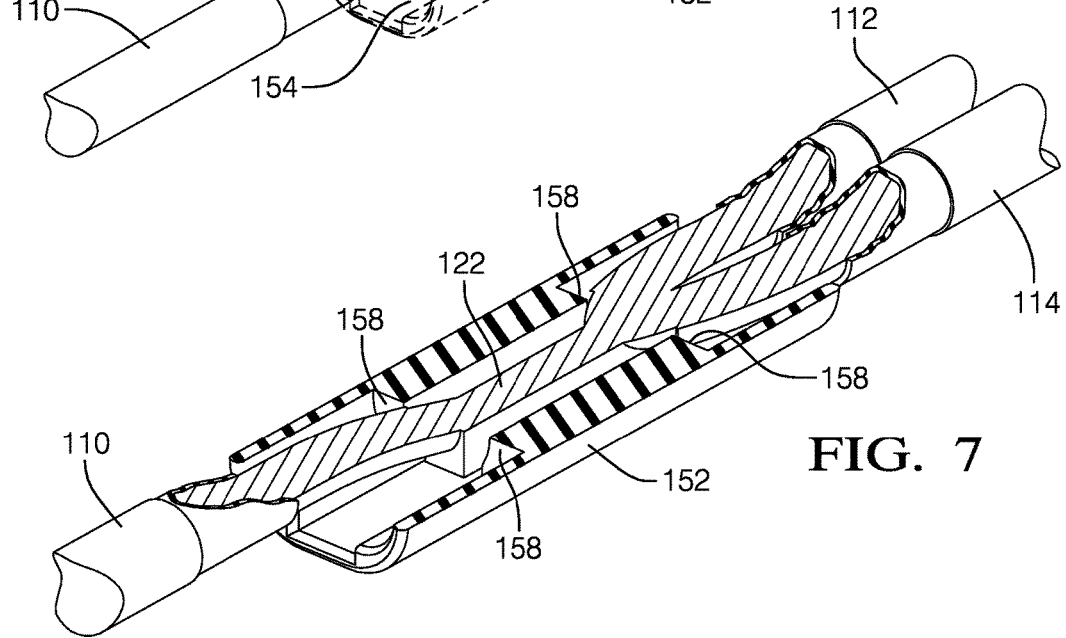
FIG. 7 is a cut-away view of the inner insulator of the wire harness assembly of FIG. 6 enclosing the core conductor splice connection in accordance with the first embodiment.

As shown in FIG. 7, the channel 154 of the inner insulator 152 may define shoulders 158 to provide a positive stop against the two joined core conductors 118, 120 and ensure proper positioning of the inner insulator 152 relative to the connection 122 and the exposed shield conductors 130, 132, 134. The inner insulator 152 may be designed with a symmetrical shape so that the shoulders 158 contact the two joined core conductors 118, 120 regardless of the orientation of the inner insulator 152 when the inner insulator 152 is placed on the single shielded wire cable 110.

Figure 8:
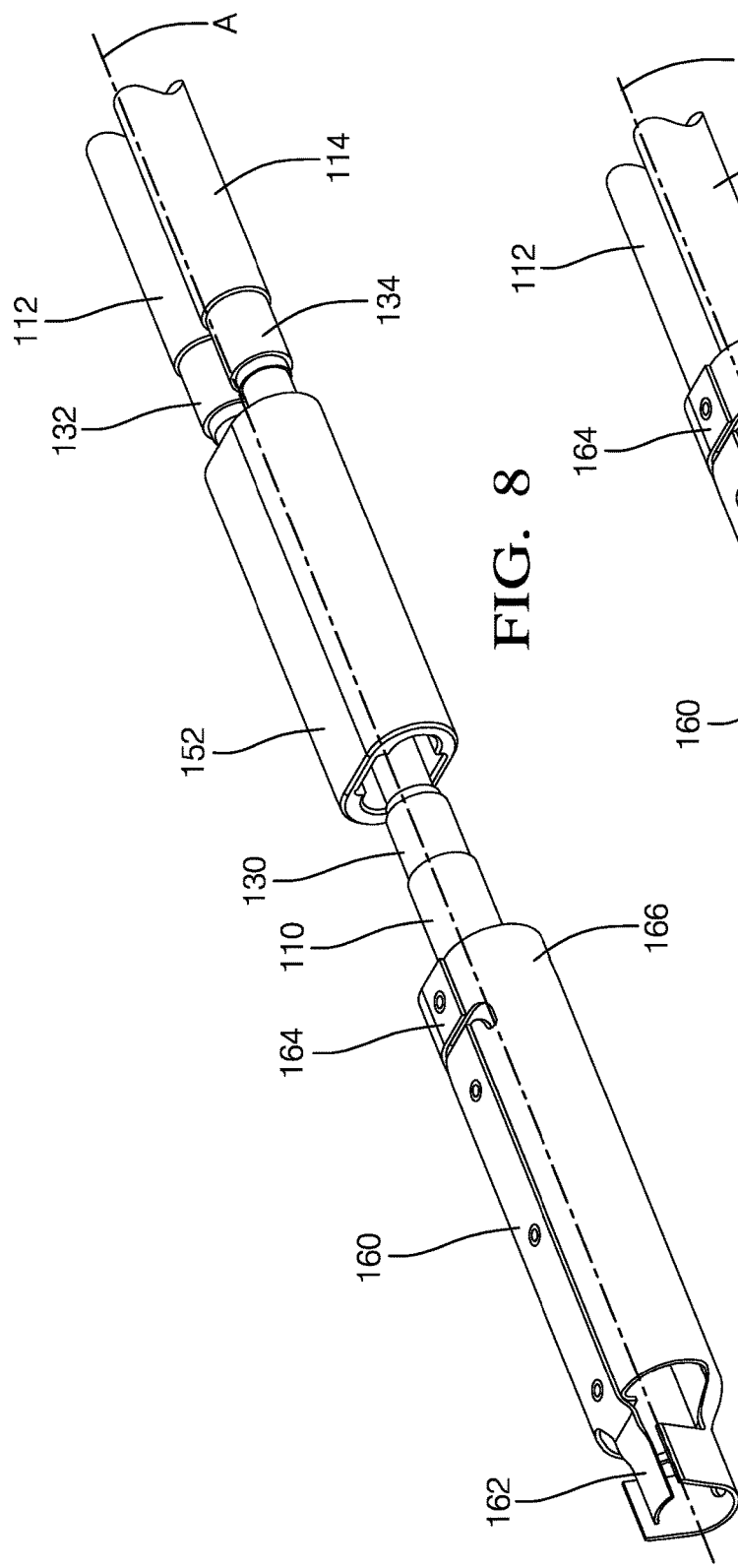
FIG. 8 is a perspective view of a wire harness assembly having a shield pre-loaded on the shielded wire cable in accordance with the first embodiment.
Figure 9:
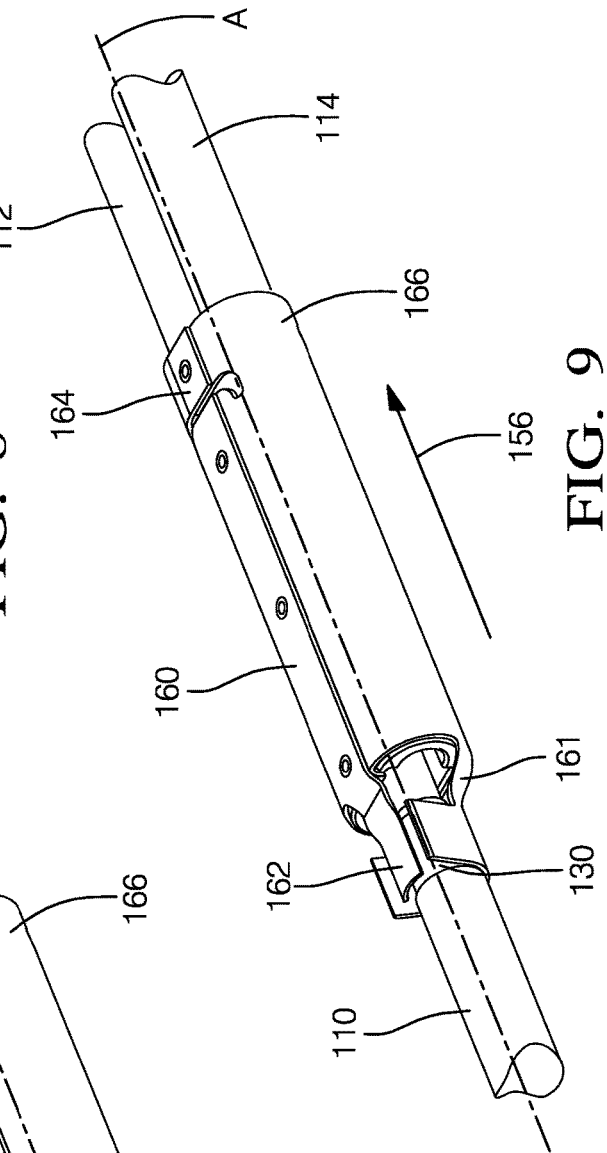
FIG. 9 is a perspective view of the shield the wire harness assembly of FIG. 8 enclosing the inner insulator in accordance with the first embodiment.

As shown in FIG. 8, the wire cable assembly 150 further includes a sleeve 160 formed of conductive material that defines an axial passage 161, hereafter referred to as a cavity 161 along a longitudinal axis A. The conductive material used to form the sleeve 160 is preferably a copper alloy, such as 425 brass and may be tin coated for corrosion resistance. As shown in FIG. 9, the sleeve 160 may be slid along the longitudinal axis A in the direction 156 over the inner insulator 152, disposing the inner insulator within the cavity 161. The sleeve 160 defines contacts 162, 164, 166 that are designed to be crimped into mechanical and electrical contact with the shield conductors 130, 132, 134. The sleeve 160 may define a generally elliptical cross section. As used herein, generally elliptical cross section means that the circumferential shape of the sleeve varies by no more than ±10% from that of an elliptical cross section.

As shown in FIG. 10, the sleeve 160 may define lock features 168 that hold the sleeve 160 in proper position over the inner insulator 152. The lock features 168 may define a pair of ramp structures 170 wherein one of the ramp structures 170 is designed to deflect as the sleeve 160 slides along the longitudinal axis A over the lock in the direction 156 and then snap back into place, thereby capturing the inner insulator 152 between the lock features 168. Alternatively, the sleeve may be slid along the longitudinal axis in the direction opposite of direction 156. The sleeve 160 may be designed with a symmetrical shape so that the lock features 168 secure the sleeve 160 to the inner insulator 152 regardless of the orientation when the sleeve 160 is placed on the single shielded wire cable 110. Other locking features well known to those skilled in the art may alternately be utilized to secure the sleeve 160 in place over the inner insulator 152. The shoulders 158 of the inner insulator 152 and the lock features 168 of the sleeve 160 cooperate to locate the exposed shield conductors 130, 132, 134 or ferrules relative to the contacts 162, 164, 166. This provides the benefit of more consistent connections between the contacts and the shield conductors in the manufacturing process.

As illustrated in FIG. 11, the contacts 162, 164, 166 are crimped to the shield conductors 130, 132, 134 or ferrules attached to the shield conductors 130, 132, 134, by applying a mechanical force to provide a mechanical and electrical connection between the sleeve 160 and the shield conductors 130, 132, 134 and provide electrical continuity between all of the shield conductors 130, 132, 134. According to the illustrated example, the sleeve defines a plurality of U-shaped slots 172 forming bands 174, 176, 178, 180 that are configured to deform when crimped to secure the sleeve to the shield conductors or ferrules. The bands 178, 180 forming contacts 164, 166 are crimped by applying force to the central portion of the bands so that central portion of the bands push the shielded wire cables 112, 114 apart and ensuring that the insulating layers of shielded cables are separated, that is are not in physical contact with one another. The portions of the first, second, and third shield conductors that are enclosed within the shield are substantially parallel to the longitudinal axis A. This provides a splice connection that is basically in-line which may be easier to package within a location with limited space, such as within an automobile. As used herein, substantially parallel means ±10° of absolutely parallel. In an alternative embodiment, the sleeve 160 may define conventional crimping wings that connect to the shield conductors or ferrules by wrapping about them and crimping. The crimping wings are configured to separate the insulating layers of the shielded cables. In another alternative embodiment, the contacts 162, 164, 166 may be electrically and mechanically connected to the shield conductors 130, 132, 134 by soldering or other processes well known to those skilled in the art rather than crimping.

Figure 12:
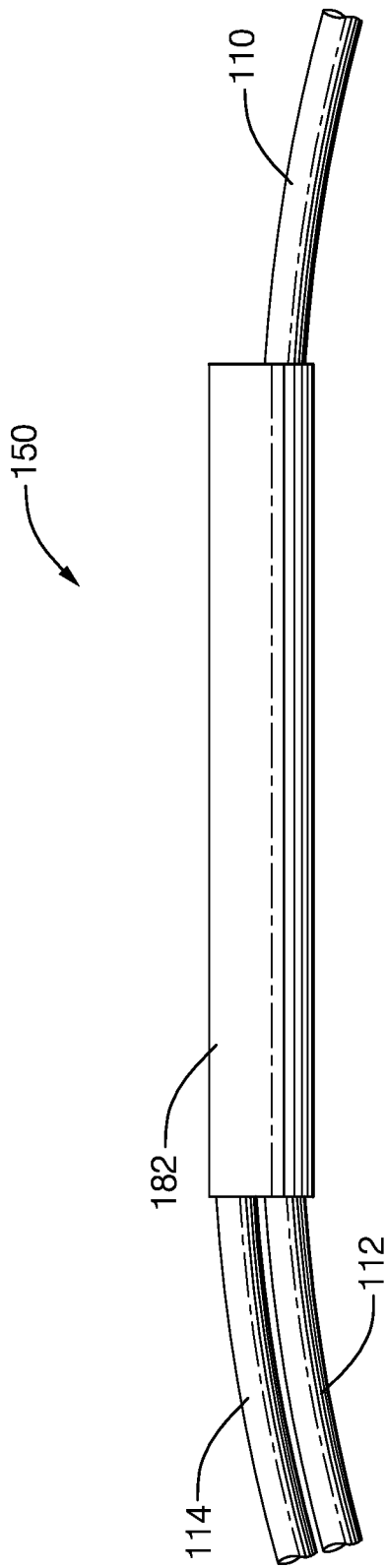
FIG. 12 is a top view of an outer insulator enclosing the shield of the wire harness assembly of FIG. 10*in* accordance with the first embodiment.
Figure 13:
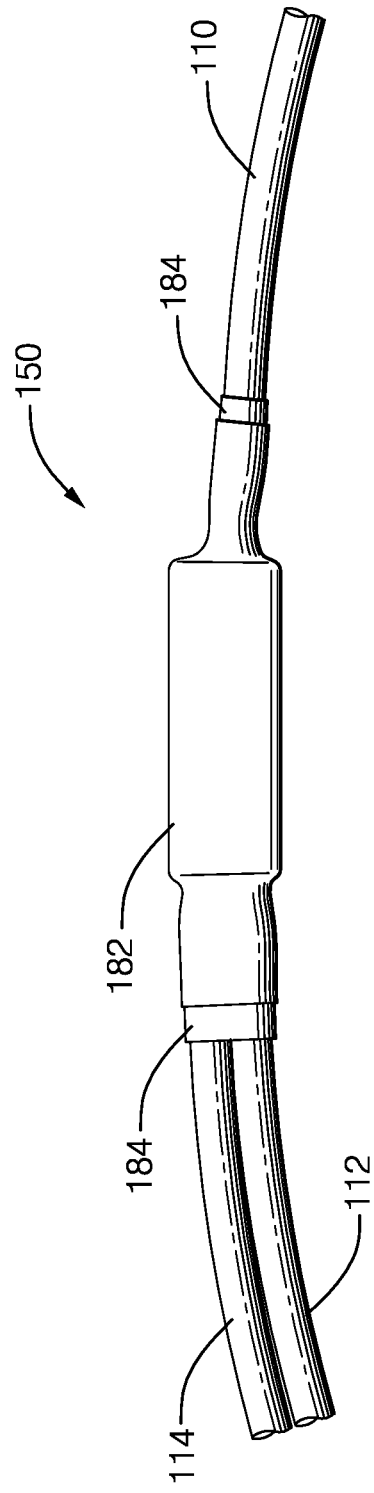
FIG. 13 is a top view of the wire harness assembly in accordance with the first embodiment.

As illustrated in FIG. 12, an outer insulator 182 formed on a dielectric material may be placed over the sleeve 160. The outer insulator 182 may be formed of a thermoplastic heat shrink tubing. Suitable compositions and sources of heat shrink tubing are well known to those skilled in the art. The outer insulator 182 may also be preloaded onto the blunt cut single shielded wire cable 110 prior to forming the connection 122. The heat shrink tubing may then be heated using methods well known to those skilled in the art to sealably engage the outer insulation layers 124, 126, 128 of at least one of the shielded wire cables 110, 112, 114 and enclose the sleeve 160 as shown in FIG. 13. As used herein, sealably engaged means that the outer insulator 182 will resist contaminants, such as dust, dirt, or fluids, from entering between the outer insulation layers 124, 126, 128 and the outer insulator 182. It does not mean that it provides a hermetic seal. Alternatively, the outer insulator 182 may comprise or may consist of a conformal coating 184, such as a silicone-based material, applied over the sleeve 160 and shielded wire cables 110, 112, 114. The inventors have discovered that separation of the insulating layers of the shielded cables by the sleeve provides the benefit of improved sealing between the outer insulator and the shielded cables. Without subscribing to any particular theory of operation, the outer insulator or the sealant within the outer insulator is able to contact the entire circumference of the outer insulation layers 126, 128, thus avoiding any gaps or voids that may be created if the outer insulation layers 126, 128 were not separated or were touching.

FIGS. 14 through 25B illustrate a non-limiting example of a process of forming a shielded cable assembly 150 having both the core conductors 116, 118, 120 and the shield conductors 130, 132, 134 of three shielded wire cables 110, 112, 114 spliced together according to a second embodiment. The embodiment illustrated here is configured to splice three shielded wire cables 110, 112, 114 together in a Y-splice configuration. However, alternative embodiments may be envisioned that are configured to splice just two shielded wire cables together or splice more than three shielded wire cables together.

Figure 14:
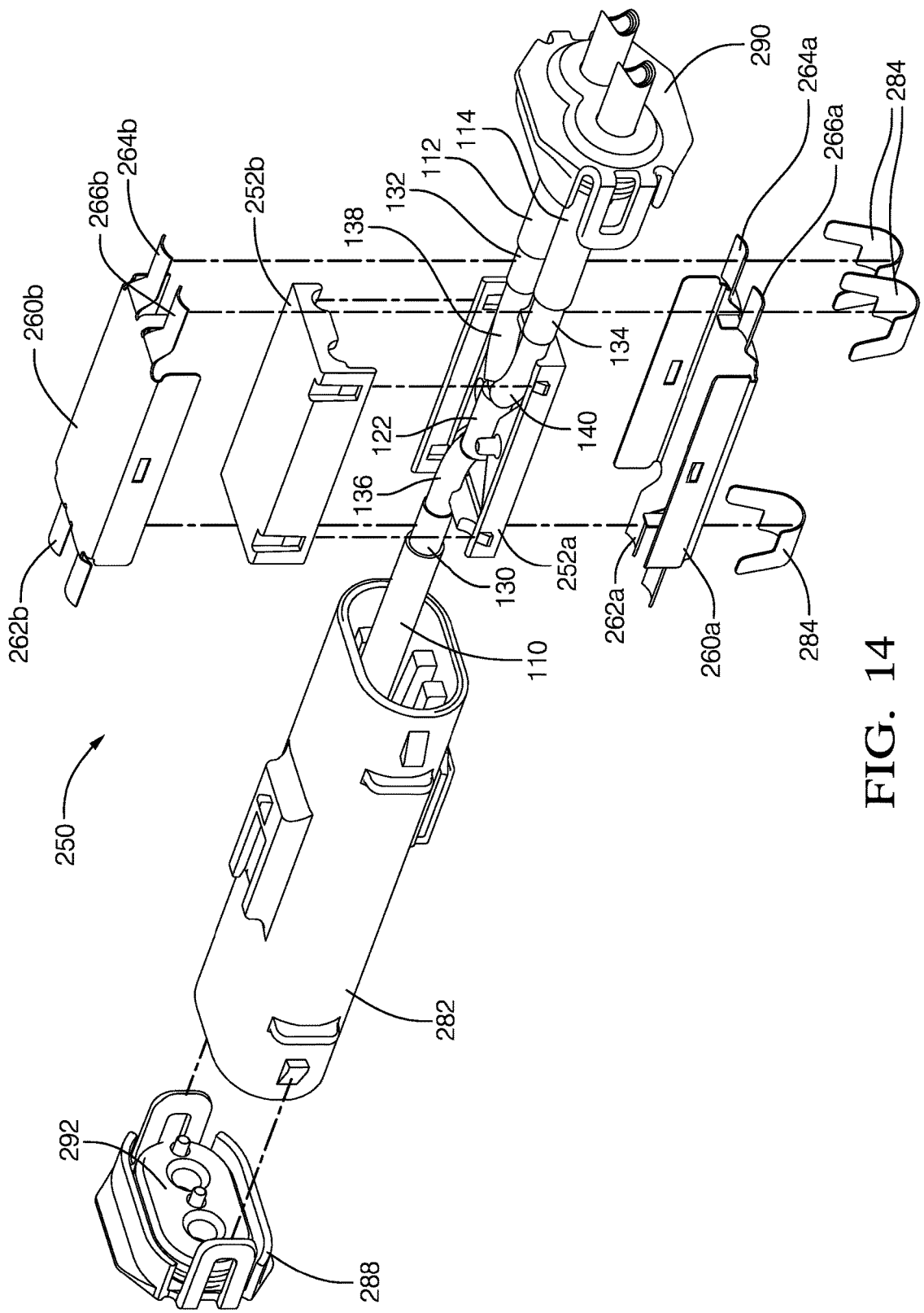
FIG. 14 is an exploded perspective view of a wiring harness assembly in accordance with a second embodiment.

FIG. 14 illustrates another non-limiting example of a wire cable assembly 250. The reference numbers in this embodiment for identical elements are the same as the previously described embodiment and the reference numbers of similar elements are 100 higher. The embodiment illustrated here is configured to splice three shielded wire cables 110, 112, 114 together by connecting the core conductor 116, 118, 120 of each of the shielded cables 110, 112, 114 to form a connection 122 as shown in FIG. 3 and described in paragraph 0042 supra. However, this embodiment may be used to splice four shielded wire cables together and other embodiments may be envisioned that are configured to splice just two shielded wire cables together or splice more than four shielded wire cables together.

The shielded cable assembly 250 includes a first inner insulator 252A formed of dielectric material and a second inner insulator 252B formed of a dielectric material. The dielectric material may be a polymer material, such as glass filed NYLON or PBT. The first inner insulator 252A and the second inner insulator 252B may be formed of the same dielectric material or they may be formed of different dielectric materials. The first inner insulator 252A and the second inner insulator 252B may be formed using an injection molding process or other plastic forming processes well known to those skilled in the art.

The first inner insulator 252A is designed to be joined to the second inner insulator 252B and when the first inner insulator 252A and the second inner insulator 252B are joined, they enclose the connection 122 and a portion of the exposed inner insulation layers 136, 138, 140 each of the shielded wire cables 110, 112, 114.

Figure 15:
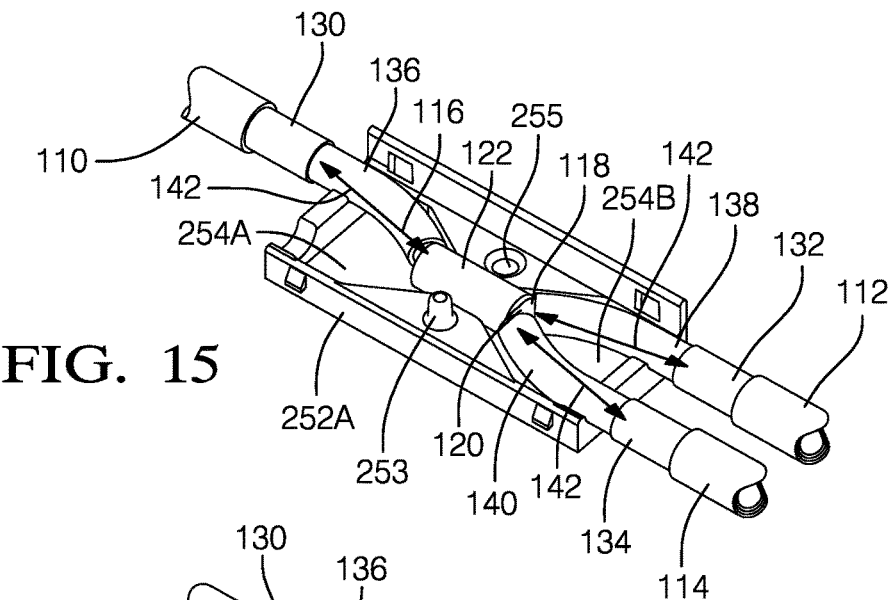
FIG. 15 is perspective view of an inner insulator of the wiring harness assembly of FIG. 14 in accordance with the second embodiment.
Figure 16:
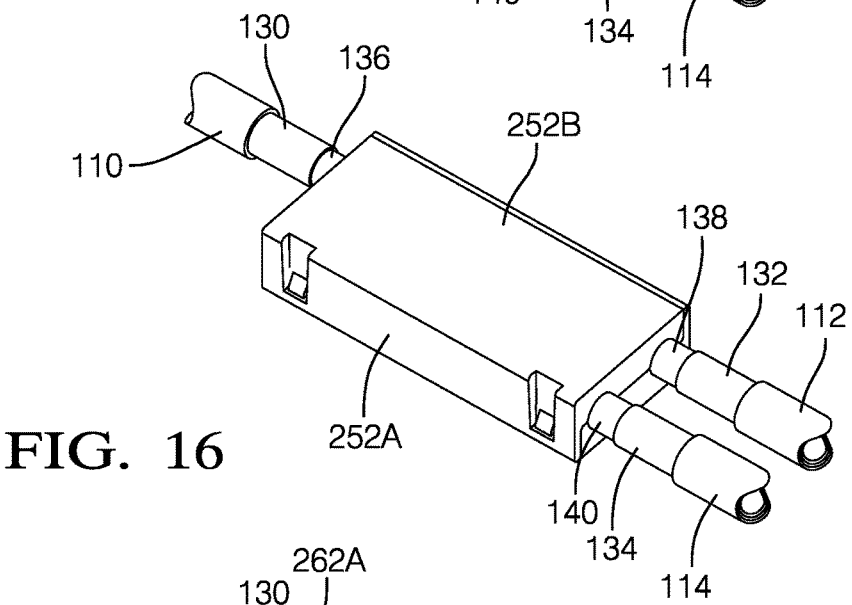
FIG. 16 is a perspective view of an assembly of the inner insulators of the wiring harness assembly of FIG. 14 in accordance with the second embodiment.
Figure 17:
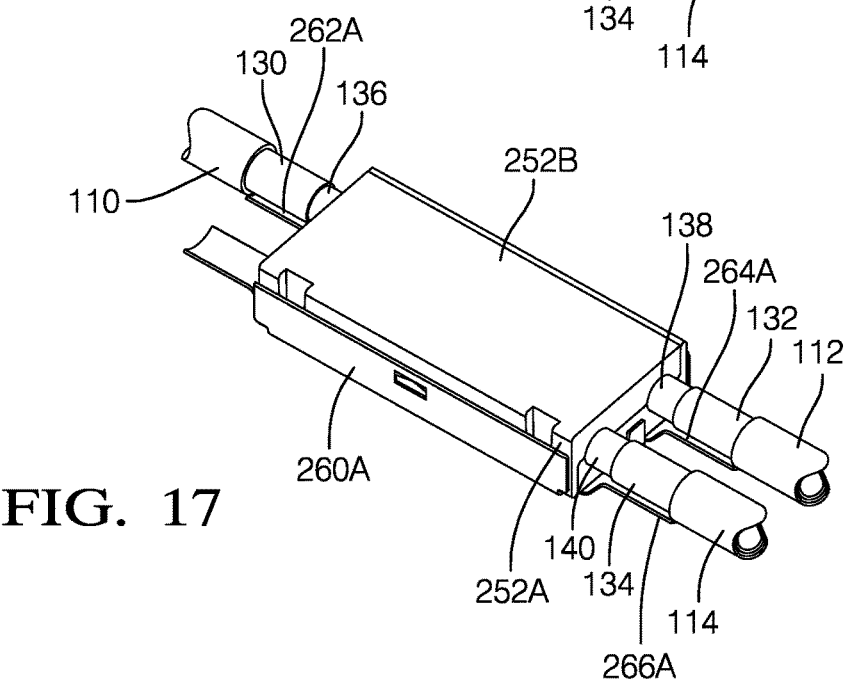
FIG. 17 is a perspective view of an assembly of inner insulators of the wiring harness assembly of FIG. 14 disposed within a portion of a sleeve in accordance with the second embodiment.

As shown in FIG. 15, the first inner insulator 252A and the second inner insulator 252B may define a pair of interconnected channels 254A, 254B to secure the joined shielded wire cables 110, 112, 114 within the first inner insulator 252A and the second inner insulator 252B. The first inner insulator 252A and the second inner insulator 252B may also include a set of mating tapered posts 253 and indentations 255 in order to facilitate alignment of the first inner insulator 252A and the second inner insulator 252B when they are assembled around the shielded wire cables 110, 112, 114. The first inner insulator 252A and the second inner insulator 252B may be designed with a hermaphroditic shape so that a single inner insulator 252 may be used for both the first inner insulator 252A and the second inner insulator 252B. In the example shown here, the joined inner insulator 252 may have an unused portion of the channel 254A.

Figure 18:
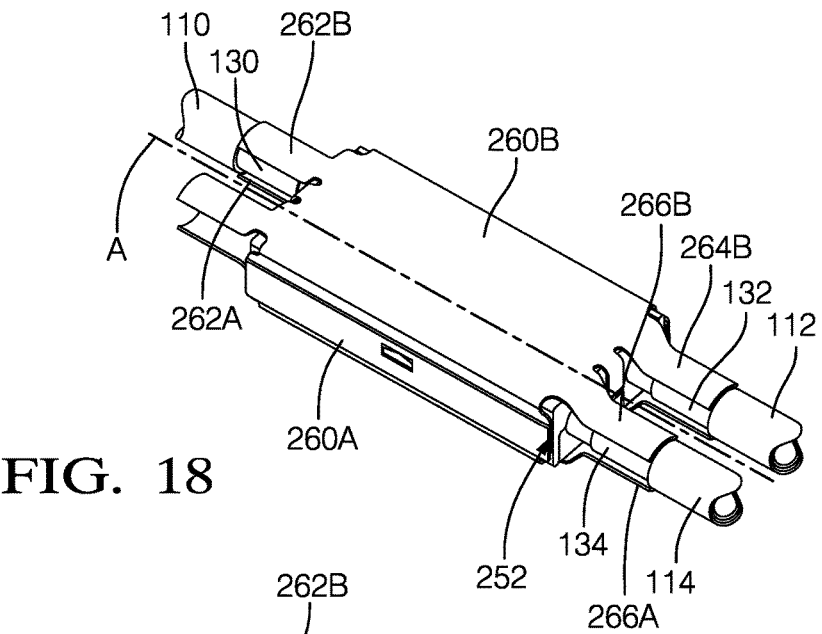
FIG. 18 is a perspective view of an assembly of inner insulators of the wiring harness assembly of FIG. 14 enclosed within a sleeve in accordance with the second embodiment.
Figure 19:
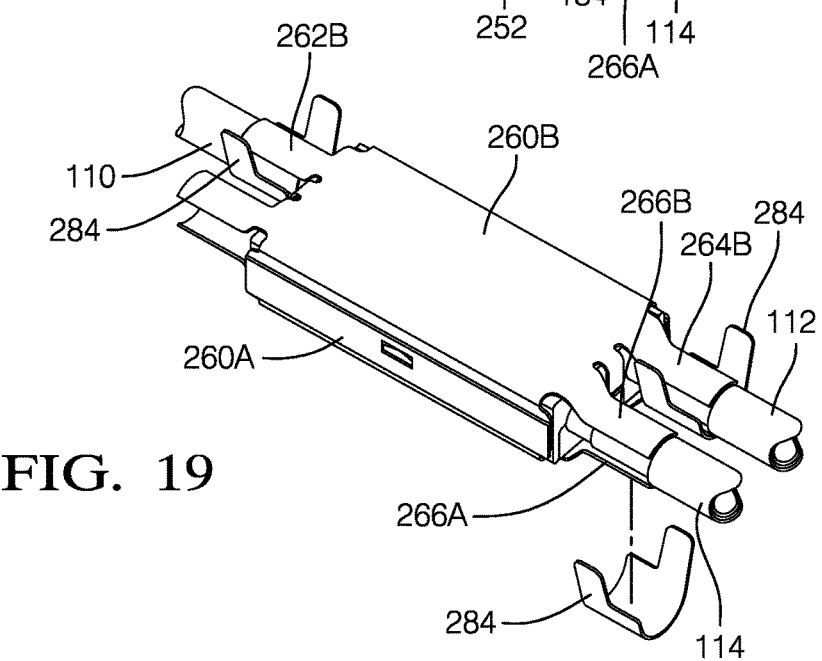
FIG. 19 is a perspective view of an assembly of fastening devices to contacts defined by the sleeve of the wiring harness assembly of FIG. 14 in accordance with the second embodiment.

As illustrated in FIG. 18, the wire cable assembly 250 further includes a sleeve 260 formed of conductive material that defines a longitudinal axis A. The conductive material used to form the sleeve 260 is preferably a copper alloy, such as 425 brass and may be tin coated for corrosion resistance. The sleeve 260 defines contacts 262, 264, 266 that are designed to be in mechanical and electrical contact with the shield conductors 130, 132, 134 of the shielded wire cables 110, 112, 114. The contacts 262, 264, 266 protrude from the sleeve 260 and form an arcuate shape configured to conform to the shield conductors 130, 132, 134 or ferrules. As illustrated in FIG. 19, the contacts 262, 264, 266 may be secured to the shield conductors 130, 132, 134 by a separate fastening device 284, such as a band or sleeve that may be crimped around the contacts 262, 264, 266.

Figure 20:
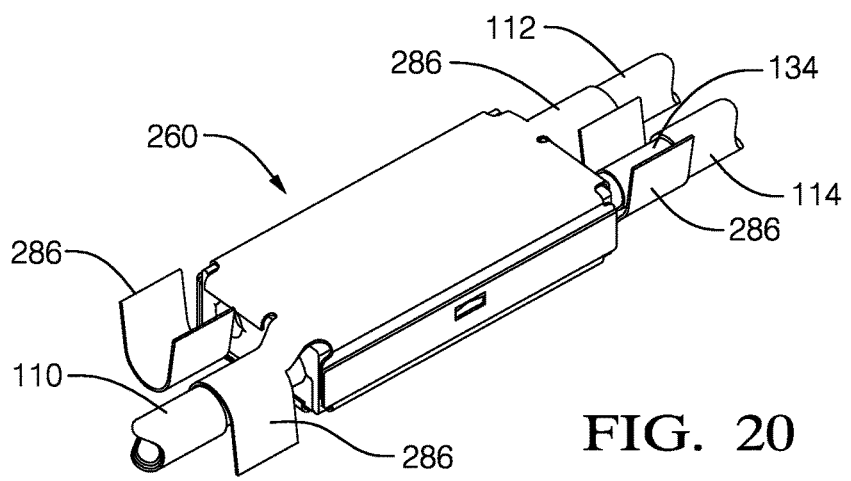
FIG. 20 is perspective view of a sleeve of the wiring harness assembly of FIG. 14 in accordance with the second embodiment.

Alternatively, as shown in FIG. 20, the contacts 262, 264, 266 may define crimp wings 286 that have an arcuate shape prior to being crimped around the shield conductors 130, 132, 134 of each of the shielded wire cables 110, 112, 114. The contacts 262, 264, 266 are designed to contact the shield conductors 130, 132, 134 to provide an electrical connection between the shield conductors 130, 132, 134 of each of the shielded wire cables 110, 112, 114. The contacts 262, 264, 266 may also be designed to mechanically secure the shielded wire cables 110, 112, 114 to the sleeve 260 and provide strain relief to the joined core conductor 116, 118, 120 of the cables.

Returning to FIG. 18, the sleeve 260 is designed to enclose the first inner insulator 252 and to define cable portals for each of the shielded wire cables 110, 112, 114 to exit the sleeve 260. The sleeve 260 may be made up of a first sleeve 260A that defines a set of contacts 262A, 264A, 266A and a second sleeve 260B that defines another set of contacts 262B, 264B, 266B. The first sleeve 260A is configured to enclose the inner insulator when mated with the second sleeve 260B. Features may be included in the joining surfaces of the first sleeve 260A and the second sleeve 260B to reduce electrical resistance. Alternatively, the first sleeve 260A and the second sleeve 260B may be secured together using conductive threaded fasteners. The first sleeve 260A and the second sleeve 260B may be designed with a hermaphroditic shape so that a single part may be used for both the first sleeve 260A and the second sleeve 260B. In the example shown here, there may be an unused portal and contact. The contacts 164, 166 push the shielded wire cables 112, 114 apart and ensuring that the insulating layers of shielded cables are separated, that is are not in physical contact with one another. The portions of the first, second, and third shield conductors that are enclosed within the shield are substantially parallel to the longitudinal axis. This provides a splice connection that is basically in-line which may be easier to package within a location with limited space, such as within an automobile.

Figure 21:
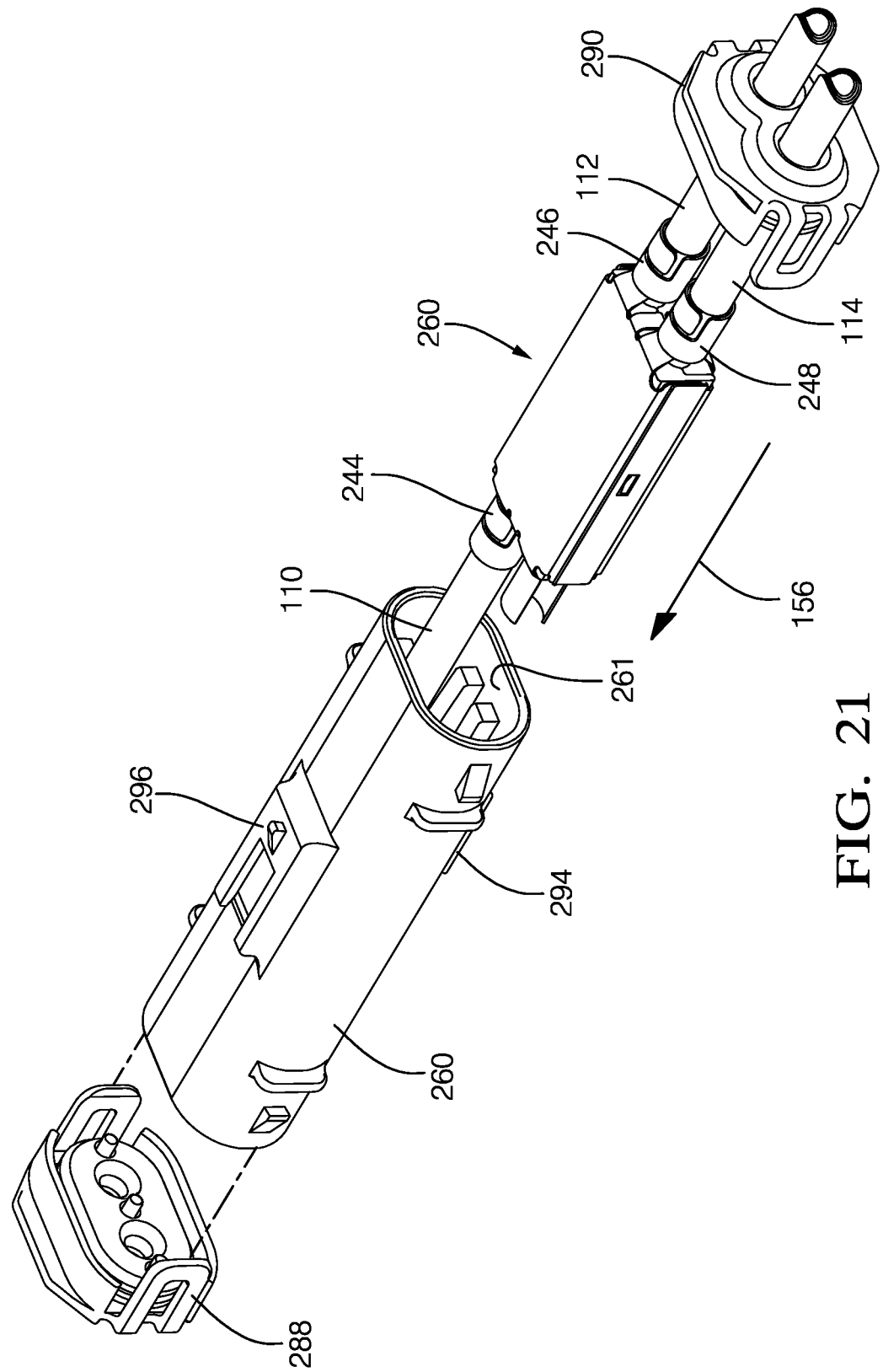
FIG. 21 is a perspective view of an assembly of a shield assembly within an outer insulator of the wiring harness assembly of FIG. 14 in accordance with the second embodiment.

As illustrated in FIG. 21, the wire cable assembly 250 may further include an outer insulator 282 formed of a nonconductive material and defining a cavity 261 that is configured to partially enclose the sleeve 260. The wire cable assembly 250 also includes a first end cap 288 that is designed to sealably engage one of the shielded wire cables 110 and sealably engage the outer insulator 282 and a second end cap 290 that is designed to sealably engage the other two shielded wire cables 112, 114. The end caps and outer insulator 282 are designed to provide environmental protection to the spliced cables by keeping contaminants such as dust, dirt, water, and other fluids away from the joined core conductors, joined inner insulator, and sleeve 260. The outer insulator 282 and end caps may be formed of a polymer material, such as NYLON or PBT. The end caps may also include a sealing element 292 formed of compliant material, such as silicone rubber. The inventors have discovered that separation of the insulating layers of the shielded cables by the sleeve provides the benefit of improved sealing between the sealing element 292 and the shielded cables. Without subscribing to any particular theory of operation, the sealing element 292 is able to contact the entire circumference of the outer insulation layers 126, 128, thus avoiding any gaps or voids that may be created if the outer insulation layers 126, 128 were not separated or were touching.

Figure 23:
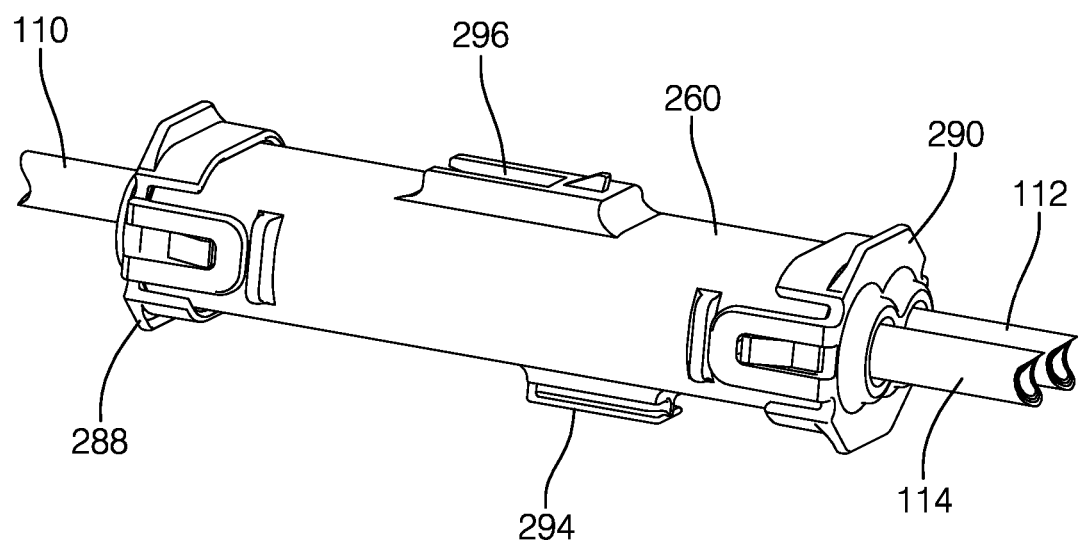
FIG. 23 is a perspective view of an assembly of the end caps to the outer insulator of the wiring harness assembly of FIG. 14 in accordance with the second embodiment.

As best illustrated in FIG. 23, the outer insulator 282 may include a male attachment feature 294 and a female attachment feature 296 that are designed to interconnect multiple outer insulators 282 as shown in FIG. 24. These attachment features 294, 296 may simplify assembly of the wiring harnesses by maintaining a spatial relationship between the outer insulators and provide a more robust wiring harness assembly because there is less likely to be vibrational contact between outer insulators that may degrade the outer insulators 282 over time.

As illustrated in FIG. 25, multiple wire cable assemblies 250 may be positioned in a staggered arrangement so that the wire cable assemblies 250 may be enclosed with a wiring conduit 298. Staggering the wire cable assemblies 250 may offer the benefit of a smaller conduit and therefore require less packaging space for the resulting wiring harness.

Alternative embodiments may be envisioned by combining various features of the two embodiments illustrated in FIGS. 4-25. For example, the inner insulator 152 and the sleeve 160 may comprise two separate portions, similar to the inner insulator 252 and sleeve 260. As another example, the sleeve 160 may define contacts that protrude from the sleeve that are attached to the shield conductors or ferrules by a separate fastening device, such as a band or sleeve that may be crimped around the contacts, similarly to the sleeve 260.

Figure 26A:
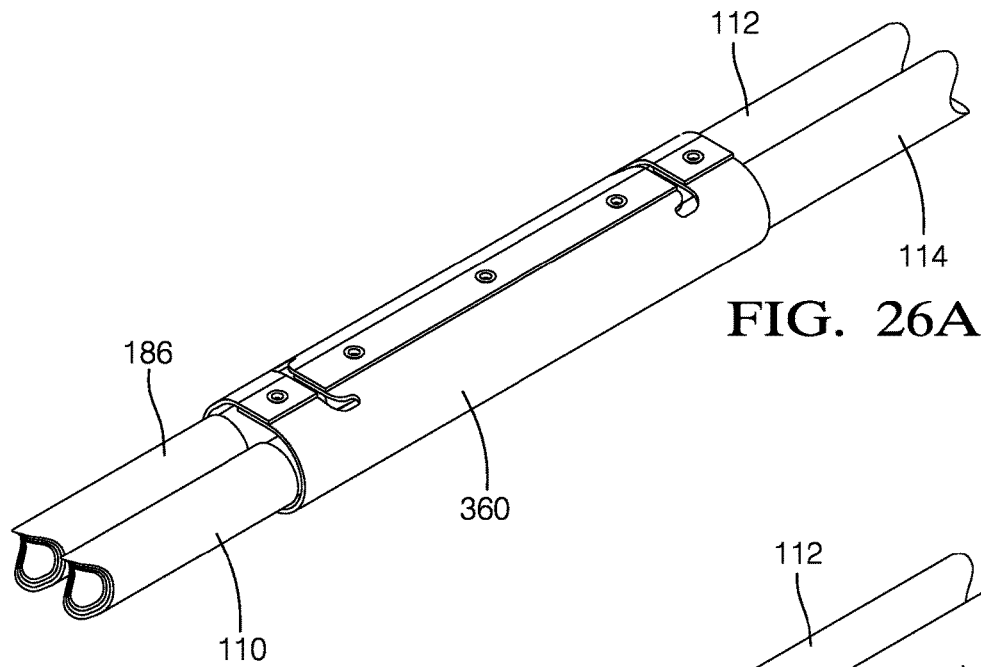
FIG. 26A is a perspective view of the shield the wire harness assembly of FIG. 9 having four shielded wire cables in accordance with the first embodiment.
Figure 26B:
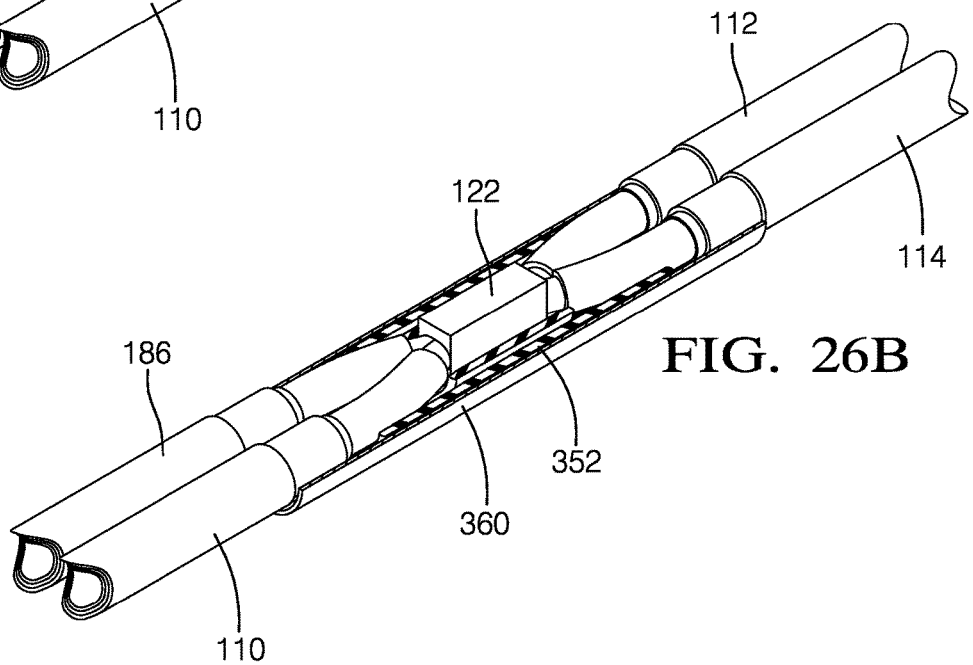
FIG. 26B is a cut-away view of the shield the wire harness assembly of FIG. 26A in accordance with the first embodiment.
Figure 26C:
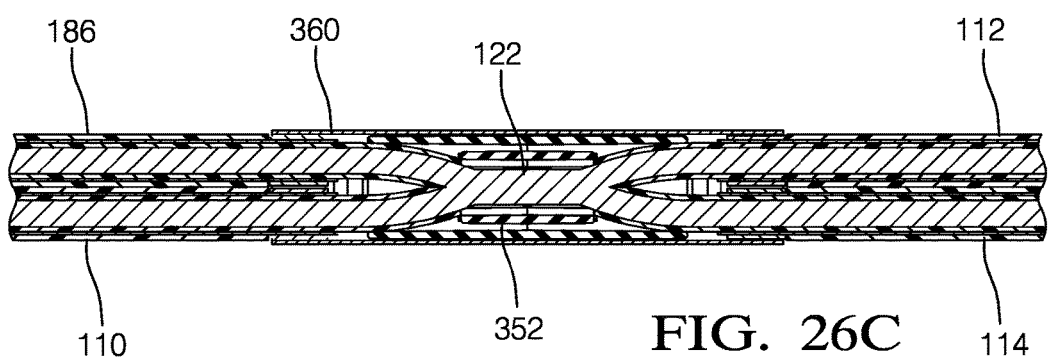
FIG. 26C is a cross section view of the shield the wire harness assembly of FIG. 26A in accordance with the first embodiment.
Figure 27A:
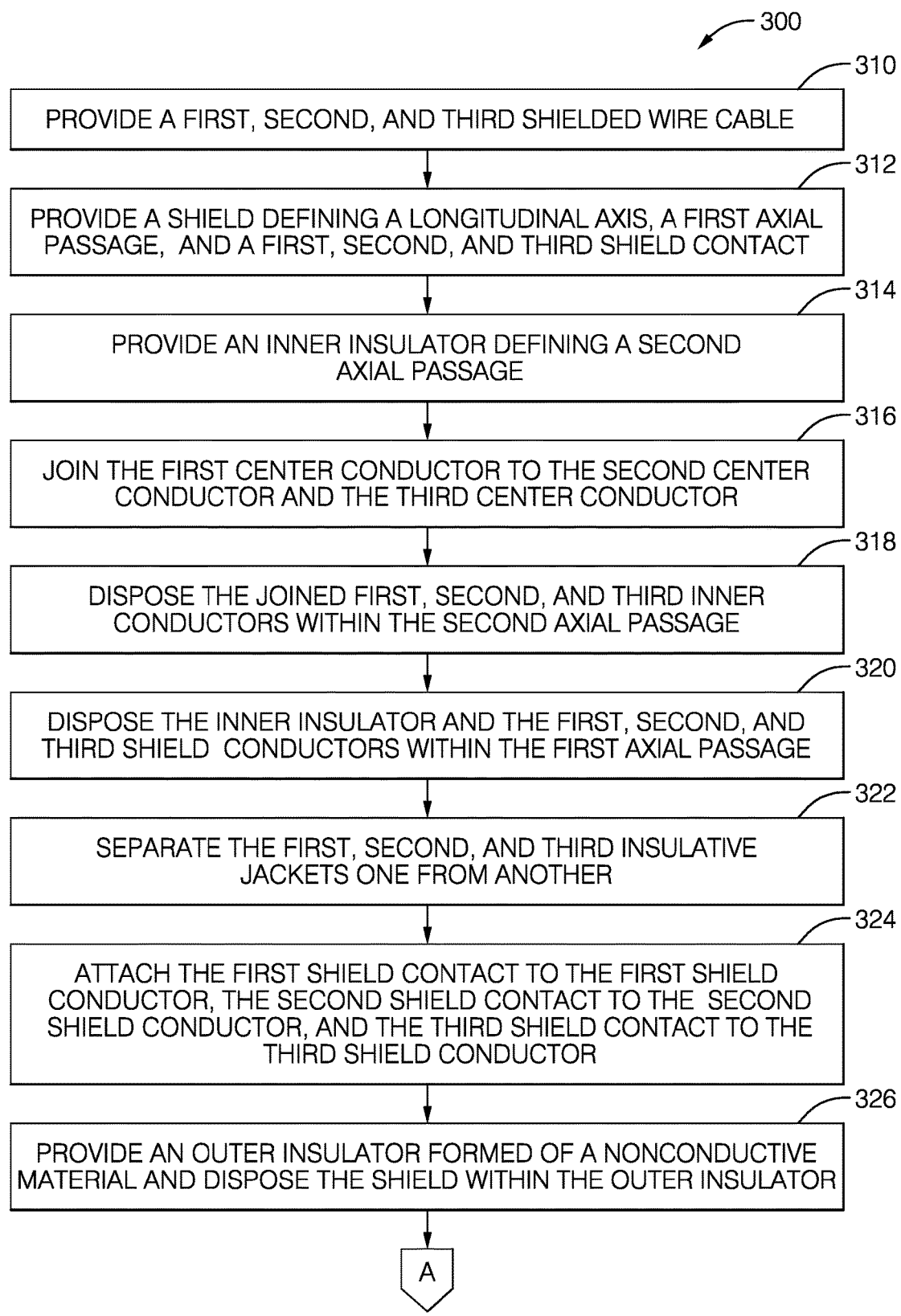
FIG. 27A is a flow chart of a method of splicing shielded wire cables in accordance with the first and second embodiment.
Figure 27B:
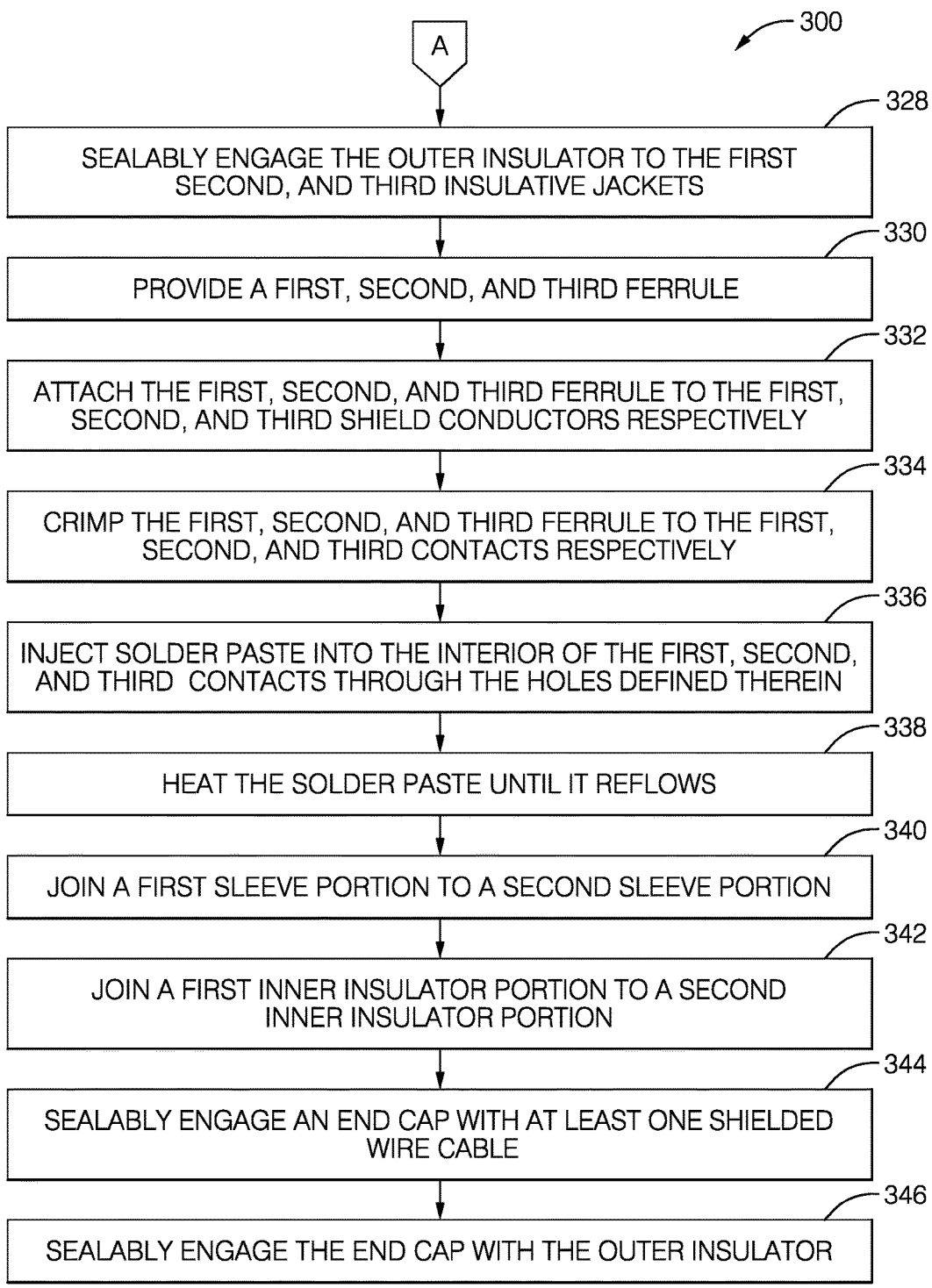
FIG. 27B is a continuation of the flow chart of FIG. 27A in accordance with the first and second embodiment.

FIG. 26 illustrates a non-limiting method 300 of splicing shielded wire cables together. The method 300 includes the following steps.

STEP 310, PROVIDE A FIRST, SECOND, AND THIRD SHIELDED WIRE CABLE, includes providing a first shielded wire cable having a first core conductor at least partially axially surrounded by a first shield conductor which is at least partially axially surrounded by a first insulative jacket, providing a second shielded wire cable having a second core conductor at least partially axially surrounded by a second shield conductor which is at least partially axially surrounded by a second insulative jacket, and providing a third shielded wire cable having a third core conductor at least partially axially surrounded by a third shield conductor which is at least partially axially surrounded by a third insulative jacket as shown in FIG. 3.

STEP 312, PROVIDE A SHIELD DEFINING A LONGITUDINAL AXIS, A FIRST AXIAL PASSAGE, AND A FIRST, SECOND, AND THIRD CONTACT, includes providing a shield that defines a longitudinal axis, a first axial passage, a first contact, a second contact, and a third contact. The shield is formed of a conductive material. The shield may be formed of one piece as shown in FIG. 9 or multiple pieces as shown in FIG. 14.

STEP 314, PROVIDE AN INNER INSULATOR DEFINING A SECOND AXIAL PASSAGE includes providing an inner insulator defining a second axial passage. The inner insulator is formed of a dielectric material. The inner insulator may be formed of one piece as shown in FIG. 5 or multiple pieces as shown in FIG. 14.

STEP 316, JOIN THE FIRST CENTER CONDUCTOR TO THE SECOND CENTER CONDUCTOR AND THE THIRD CENTER CONDUCTOR, includes joining the first core conductor to the second core conductor and to the third core conductor to form a mechanical and electrical connection between the core conductors as shown in FIG. 3. The core conductors may be joined by sonic welding, soldering, or other methods of joining wires known to those skilled in the art. The inner insulator and the ferrules may be preloaded onto the shielded cables prior to joining the core conductors.

STEP 318, DISPOSE THE JOINED FIRST, SECOND, AND THIRD CORE CONDUCTORS WITHIN THE SECOND AXIAL PASSAGE, includes disposing the connection including the joined first, second, and third core conductors within the second axial passage, or channel, of the inner insulator as shown in FIGS. 6 and 15. The joined first, second, and third core conductors may be slideably disposed within the second axial passage as shown in FIG. 6.

STEP 320, DISPOSE THE INNER INSULATOR AND THE FIRST, SECOND, AND THIRD SHIELD CONDUCTORS WITHIN THE FIRST AXIAL PASSAGE, includes disposing the inner insulator and the first, second, and third shield conductors within the first axial passage as shown in FIGS. 8-9 and 17-18. The portions of the first, second, and third shield conductors that are disposed within the inner insulator are substantially parallel to the longitudinal axis. The inner insulator and the first, second, and third shield conductors may be slidably disposed within the first axial passage as shown in FIGS. 8-9.

STEP 322, SEPARATE THE FIRST, SECOND, AND THIRD INSULATIVE JACKETS ONE FROM ANOTHER, includes separating the first, second, and third insulative jackets one from another. This may be accomplished by the connection of the first, second, and third shield conductors to the contacts as shown in FIGS. 11 and 19.

STEP 324, ATTACH THE FIRST CONTACT TO THE FIRST SHIELD CONDUCTOR, THE SECOND CONTACT TO THE SECOND SHIELD CONDUCTOR, AND THE THIRD CONTACT TO THE THIRD SHIELD CONDUCTOR, includes attaching the first contact to the first shield conductor, the second contact to the second shield conductor, and the third contact to the third shield conductor, thereby providing a conductive path between the first, second, and third shield conductors. The contacts may be attached to the shield conductors by crimping wings, ferrules, soldering, or other methods known to those skilled in the art.

Figure 22:
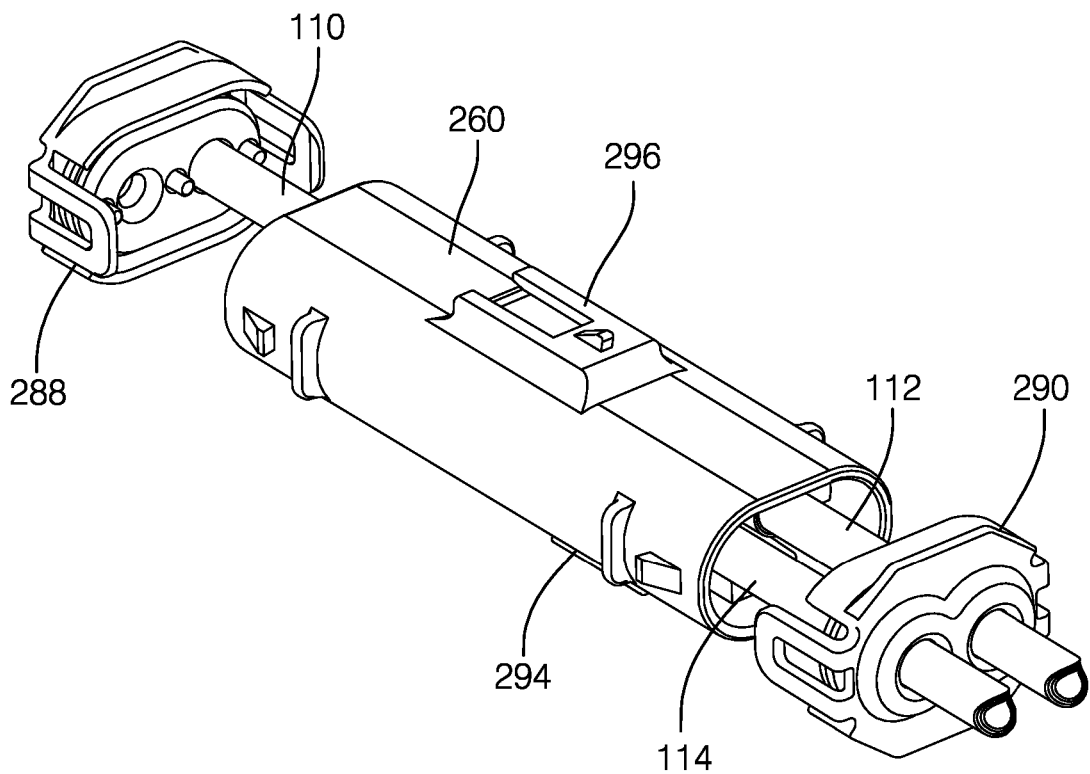
FIG. 22 is a perspective view of an assembly of end caps to shielded wire cables of the wiring harness assembly of FIG. 14 in accordance with the second embodiment.

STEP 326, DISPOSE THE SHIELD WITHIN THE OUTER INSULATOR, includes disposing the shield within the outer insulator as illustrated in FIGS. 12 and 21-22.

STEP 328, SEALABLY ENGAGE THE OUTER INSULATOR TO THE FIRST, SECOND, AND THIRD INSULATIVE JACKETS, includes sealably engaging the outer insulator to the first, second, and third insulative jackets, thereby enclosing the shield within the outer insulator as illustrated in FIGS. 13 and 22-23.

Method 300 may further include the following optional steps.

Prior to step 324, method 300 may include STEP 330, PROVIDE A FIRST, SECOND, AND THIRD FERRULE, which includes providing a first, second, and third ferrule.

Following step 330, method 300 may include STEP 332, ATTACH THE FIRST, SECOND, AND THIRD FERRULE TO THE FIRST, SECOND, AND THIRD SHIELD CONDUCTORS RESPECTIVELY, which includes attaching the first, second, and third ferrule to the first, second, and third shield conductors respectively.

Following step 330, method 300 may include STEP 334, CRIMP THE FIRST, SECOND, AND THIRD FERRULE TO THE FIRST, SECOND, AND THIRD CONTACTS RESPECTIVELY, which includes crimping the first, second, and third ferrule to the first, second, and third contacts respectively, thereby attaching the first, second, and third contacts to the first, second, and third shield conductors respectively.

Prior to step 324, method 300 may include STEP 336, INJECT SOLDER PASTE INTO THE INTERIOR OF THE FIRST, SECOND, AND THIRD CONTACTS THROUGH THE HOLES DEFINED THEREIN, which includes injecting solder paste into the interior of the first, second, and third contacts through holes defined by the first, second, and third contacts.

Following step 336, method 300 may include STEP 338, HEAT THE SOLDER PASTE UNTIL IT REFLOWS, which includes heating the solder paste until it reflows, thereby soldering the first, second, and third contacts to the first, second, and third shield conductors respectively.

Prior to step 320, method 300 may include STEP 340, JOIN A FIRST SLEEVE PORTION TO A SECOND SLEEVE PORTION, which includes joining the first sleeve portion to the second sleeve portion, thereby disposing the joined first, second, and third core conductors within the second axial passage, wherein the sleeve includes a first sleeve portion and a second sleeve portion.

Prior to step 318, method 300 may include STEP 342, JOIN A FIRST INNER INSULATOR PORTION TO A SECOND INNER INSULATOR PORTION, which includes joining the first inner insulator portion to the second inner insulator portion, thereby disposing the inner insulator and the first, second, and third shield conductors within the first axial passage, wherein the inner insulator includes a first inner insulator portion and a second inner insulator portion.

Following step 326, method 300 may include STEP 344, SEALABLY ENGAGE AN END CAP WITH AT LEAST ONE SHIELDED WIRE CABLE, which includes joining sealably engaging the end cap with the at least one shielded wire cable, wherein the outer insulator further includes an end cap configured to sealably engage the outer insulator and at least one shielded wire cable.

Following step 344, method 300 may include STEP 346, SEALABLY ENGAGE THE END CAP WITH THE OUTER INSULATOR, which includes engaging the end cap with the outer insulator, thereby enclosing the shield within the outer insulator.

Figure 28:
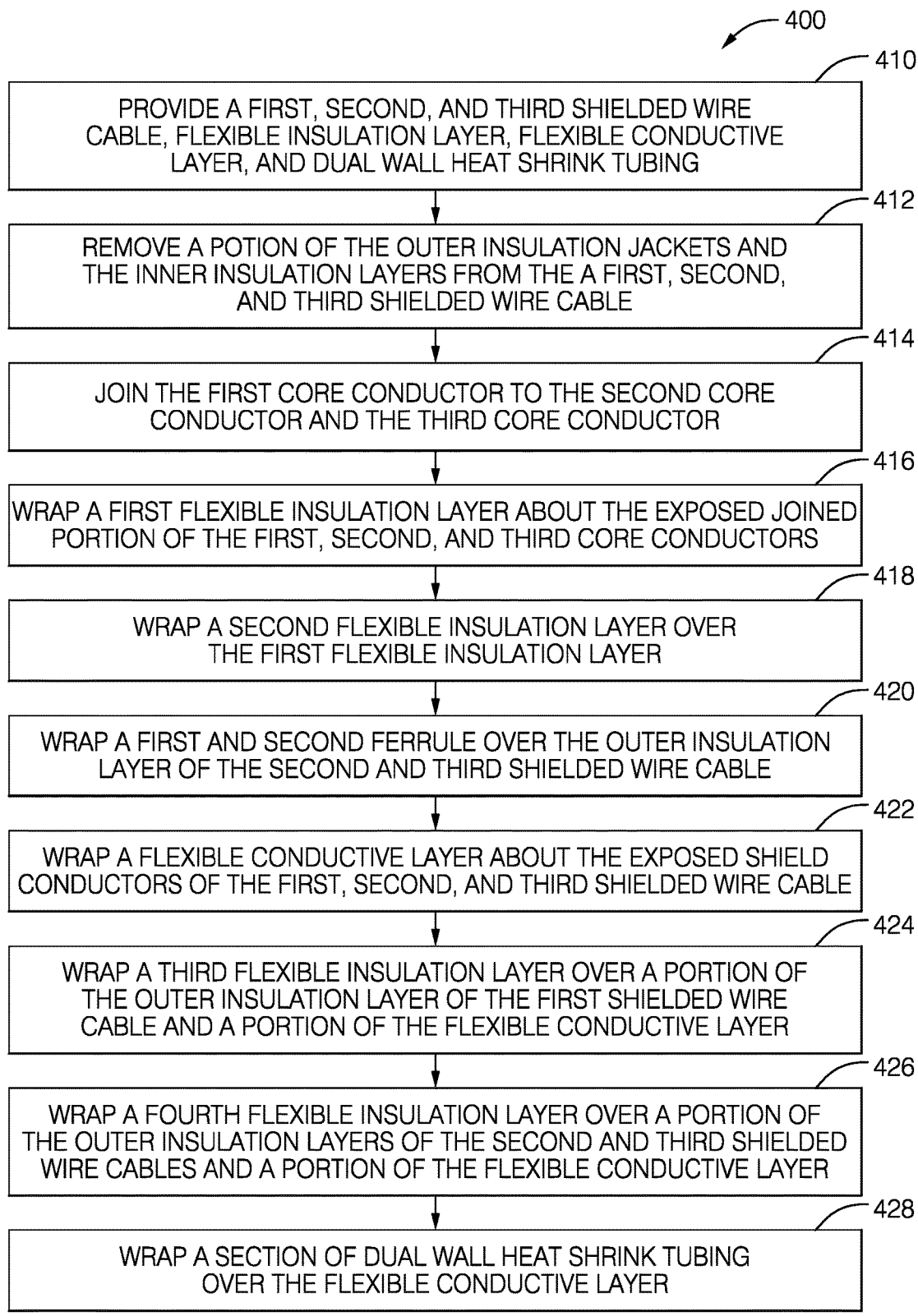
FIG. 28 is a flow chart of a method of splicing shielded wire cables in accordance with a third embodiment.

FIG. 28 illustrates another non-limiting method 400 of splicing shielded wire cables together. The method 400 includes the following steps.

STEP 410, PROVIDE A FIRST, SECOND, AND THIRD SHIELDED WIRE CABLE, FLEXIBLE INSULATION LAYER, FLEXIBLE CONDUCTIVE LAYER, AND DUAL WALL HEAT SHRINK TUBING, includes providing a first shielded wire cable 110 having a first core conductor 116 at least partially axially surrounded by a first inner insulation layer 136 which is at least partially axially surrounded by a first shield conductor 130 which is at least partially axially surrounded by a first insulative jacket 124, providing a second shielded wire cable 112 having a second core conductor 118 at least partially axially surrounded by a second inner insulation layer 138 which is at least partially axially surrounded by a second shield conductor 132 which is at least partially axially surrounded by a second insulative jacket 126, and providing a third shielded wire cable 116 having a third core conductor 120 at least partially axially surrounded by a third inner insulation layer 140 which is at least partially axially surrounded by a third shield conductor 134 which is at least partially axially surrounded by a third insulative jacket 128 as shown in FIG. 3. Step 410 also includes providing a flexible dielectric insulation layer that may be formed of a flexible dielectric material such as heat shrinkable plastic tubing made of a heat shrinkable plastic (e.g. polyolefin), cloth tape, or plastic tape. The flexible insulation layer provided may be divided into sections of varied length and/or the flexible insulation layer may comprise various types of insulation such as those described above and applied to various portions of the wire harness assembly. Step 410 further includes providing a flexible conductive layer 518 that may be formed of a sleeve of braided wire strands (e.g. tin plated copper wire strands), a metallic foil (e.g. copper or aluminum foil), or a metallized plastic film (e.g. aluminized MYLAR film). The flexible conductive layer 518 is not impregnated with solder and does not include solder.

STEP 412, REMOVE A POTION OF THE OUTER INSULATIVE JACKETS AND THE INNER INSULATION LAYERS FROM THE A FIRST, SECOND, AND THIRD SHIELDED WIRE CABLE, includes removing a portion of the outer insulative jackets 124, 126, 128 of the first, second, and third shield wire cables 112, 114, 116 to expose the shield conductors 130, 132, 134 and removing a portion of the shield conductors 130, 132, 134 and the inner insulation layers 136, 138, 140 to expose the core conductors 116, 118, 120 as shown in FIG. 3.

STEP 414, JOIN THE FIRST CORE CONDUCTOR TO THE SECOND CORE CONDUCTOR AND THE THIRD CORE CONDUCTOR, includes joining the first core conductor 116 to the second core conductor 118 and to the third core conductor 120 to form a mechanical and electrical connection 122 between the core conductors 116, 118, 120 as shown in FIG. 3. The core conductors 116, 118, 120 may be joined by sonic welding, soldering, or other methods of joining wires known to those skilled in the art.

Figure 29:
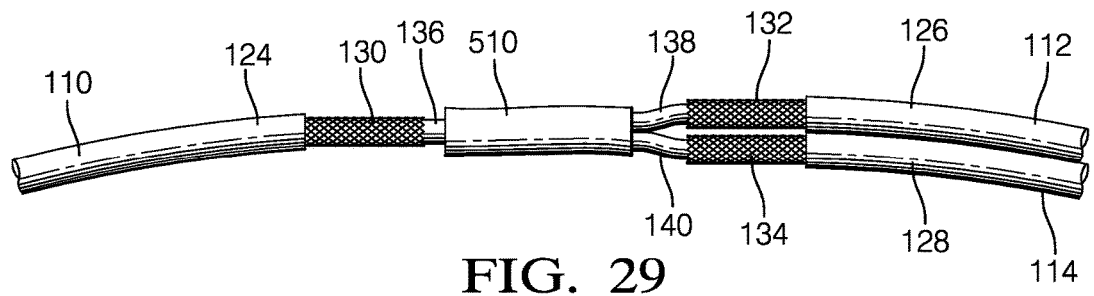
FIG. 29 is a top view of a wire harness assembly having a first flexible insulative layer wrapped about the spliced shielded wire cable of FIG. 3 in accordance with the third embodiment.

STEP 416, WRAP A FIRST FLEXIBLE INSULATION LAYER ABOUT THE EXPOSED JOINED PORTION OF THE FIRST, SECOND, AND THIRD CORE CONDUCTORS, is an optional step that includes wrapping a first flexible insulation layer 510 about the joined portion 122 and the exposed portions of the core conductors 116, 118, 120 so as to completely cover and enclose the exposed portions of the core conductors 116, 118, 120 while leaving the shield conductors 130, 132, 134 exposed as shown in FIG. 29. The first flexible insulation layer 510 may be formed of a flexible dielectric material such as heat shrinkable plastic tubing, cloth tape, or plastic tape.

Figure 30:
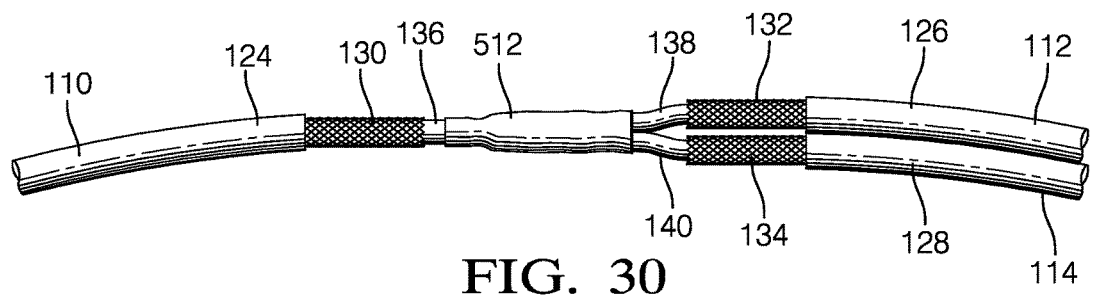
FIG. 30 is a top view of a wire harness assembly having a second flexible insulative layer insulator wrapped about the first flexible insulative layer of FIG. 29 in accordance with the third embodiment.

STEP 418, WRAP A SECOND FLEXIBLE INSULATION LAYER OVER THE FIRST FLEXIBLE INSULATION LAYER, includes wrapping a second flexible insulation layer 512 over the first flexible insulation layer 510 while still leaving the shield conductors 130, 132, 134 exposed as shown in FIG. 30. The second flexible insulation layer 512 may be a section of heat shrinkable plastic tubing that is placed over the first flexible insulation layer 510 and heated until it is in compressive contact with and encloses the first flexible insulation layer 510. The second flexible insulation layer 512 may protect the first flexible insulation layer 510 from moisture that could degrade the insulative properties of the first flexible insulation layer 510. The first flexible insulative layer 510 may be an adhesive backed polyester tape to protect the second flexible insulation layer from abrasion that could be caused by edges of the joined portion 122. The adhesive backing may simplify application of the cloth tape.

Figure 31:
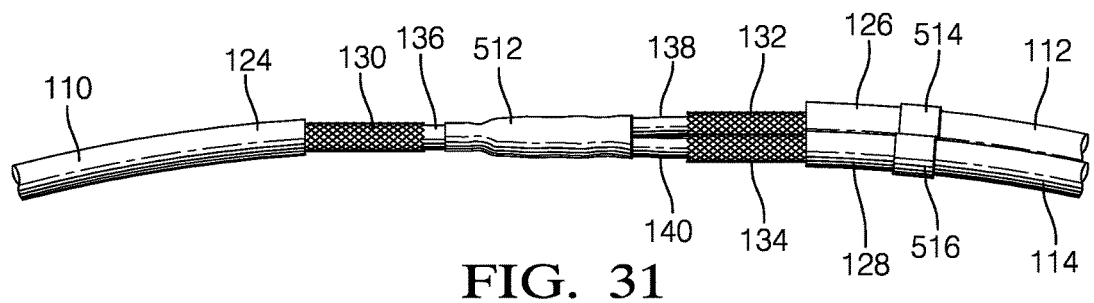
FIG. 31 is a top view of a wire harness assembly having a first and second ferrule insulator wrapped about the outer insulative jackets of two of the shielded wire cables of FIG. 30 in accordance with the third embodiment.

STEP 420, WRAP A FIRST AND SECOND FERRULE OVER THE OUTER INSULATION LAYER OF THE SECOND AND THIRD SHIELDED WIRE CABLE, is an optional step that includes wrapping or placing first and second nonconductive ferrules 514, 516 over the outer insulation layers 126, 126 of the second and third shielded wire cables 112, 114 so that the first and second ferrules 514, 516 are proximate the exposed shield conductors 132, 134 of the second and third shielded wire cables 112, 114 and adjacent to one another as shown in FIG. 31. The first and second ferrules 514, 516 may be formed of sections of heat shrinkable plastic tubing that is placed over the second and third shielded wire cables 112, 114 and heated until it is in compressive contact with the outer insulation layers 126, 128 of the wire cables 112, 114. Alternatively, the first and second ferrules 514, 516 may be plastic rings placed over the outer insulation layers 126, 128 of the second and third shielded wire cables 112, 114. The first and second ferrules 514, 516 provide a gap between the outer insulation layers 126, 126 of the second and third shielded wire cables 112, 114.

Figure 32:
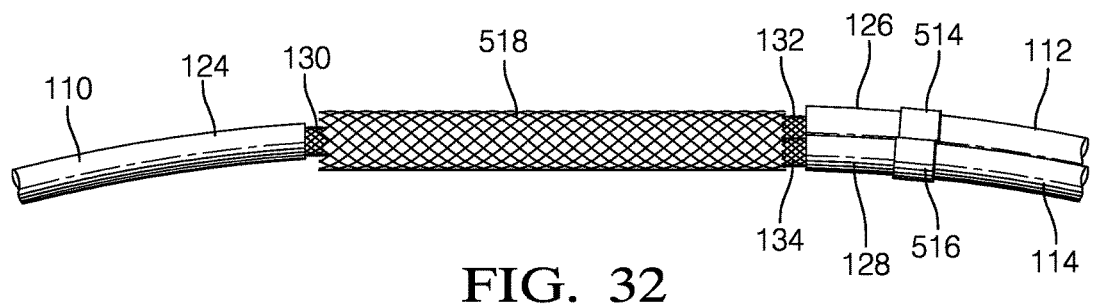
FIG. 32 is a top view of a wire harness assembly having a flexible conductive layer wrapped about the exposed shield conductors of the shielded wire cables of FIG. 31 in accordance with the third embodiment.

STEP 422, WRAP A FLEXIBLE CONDUCTIVE LAYER ABOUT THE EXPOSED SHIELD CONDUCTORS OF THE FIRST, SECOND, AND THIRD SHIELDED WIRE CABLE, includes wrapping a flexible conductive layer 518 over at least a portion of the exposed shield conductors 130, 132, 134 so that it is electrical contact with all of the shield conductors 130, 132, 134 as shown in FIG. 32. The flexible conductive layer 518 is preferably not in contact with the outer insulation layers 124, 126, 126 of the shielded wire cables 110, 112, 114.

Figure 33:
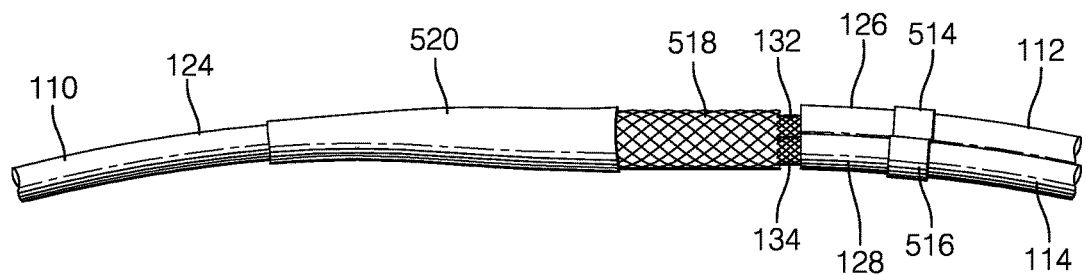
FIG. 33 is a top view of a wire harness assembly having a third flexible insulation layer wrapped about a portion of the flexible conductive layer of FIG. 32 in accordance with the third embodiment.

STEP 424, WRAP A THIRD FLEXIBLE INSULATION LAYER OVER A PORTION OF THE OUTER INSULATION LAYER OF THE FIRST SHIELDED WIRE CABLE AND A PORTION OF THE FLEXIBLE CONDUCTIVE LAYER, is an optional step that includes wrapping a third flexible insulation layer 520 over a portion of the outer insulation layer 124 of the first shielded wire cable 112 that is proximate the exposed shield conductor 130 and over a portion of the flexible conductive layer 518 as shown in FIG. 33. STEP 422 may include placing the third flexible insulation layer 520 which is a section of heat shrinkable plastic tubing over the outer insulation layer 124 of the first shield wire cable 112 and a portion of the flexible conductive layer 518 and heating the heat shrinkable tubing until it is in compressive contact with and encloses the outer insulation layer 124 of the first shield wire cable 112 and a portion of the flexible conductive layer 518. The shield conductor 130 is preferably completely enclosed by the third flexible insulation layer 520.

Figure 34:
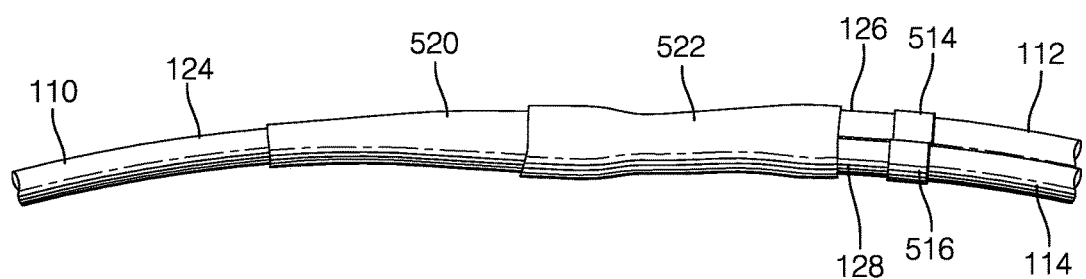
FIG. 34 is a top view of a wire harness assembly having a fourth flexible insulation layer wrapped about a portion of the flexible conductive layer and the third flexible insulation layer of FIG. 33 in accordance with the third embodiment.

STEP 426, WRAP A FOURTH FLEXIBLE INSULATION LAYER OVER A PORTION OF THE OUTER INSULATION LAYERS OF THE SECOND AND THIRD SHIELDED WIRE CABLES AND A PORTION OF THE FLEXIBLE CONDUCTIVE LAYER, is an optional step that includes wrapping a fourth flexible insulation layer 522 over a portion of the outer insulation layers 126, 128 of the second and third shielded wire cables 112, 114 that is proximate the exposed shield conductors 132, 134 and over a portion of the flexible conductive layer 518, but not over the first and second ferrules 514, 516 as shown in FIG. 34. The fourth flexible insulation layer 522 may also be applied over a portion of the third flexible insulation layer 520 so that it overlaps the third flexible insulation layer 520. STEP 426 may include placing the fourth flexible insulation layer 522 which is a section of heat shrinkable plastic tubing over outer insulation layers 126, 128 of the second and third shield wire cables 112, 114 and a portion of the flexible conductive layer 518 and heating the heat shrinkable tubing until it is in compressive contact with and encloses the outer insulation layers 126, 128 of the second and third shielded wire cable 112, 114 and a portion of the flexible conductive layer 518. The fourth flexible insulation layer 522 may also overlap a portion of the third flexible insulation layer 520 so that enclosure of the flexible conductive layer 518 is assured. The section of heat shrink tubing used for the fourth flexible insulation layer 522 may have a larger diameter than the section of heat shrink tubing used for the third flexible insulation layer 520 in STEP 424 before it is heated.

Figure 35:
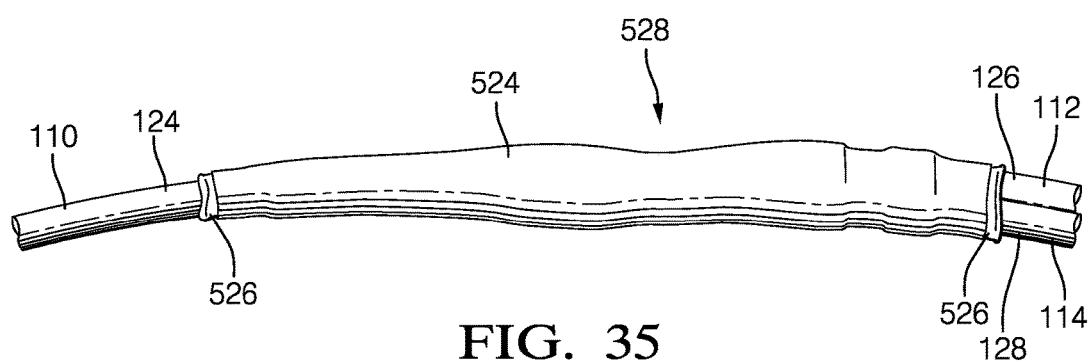
FIG. 35 is a top view of a wire harness assembly having a section of dual wall heat shrink tubing wrapped about the third and fourth flexible insulation layer and the first and second ferrules of FIG. 34 in accordance with the third embodiment.
Figure 36:
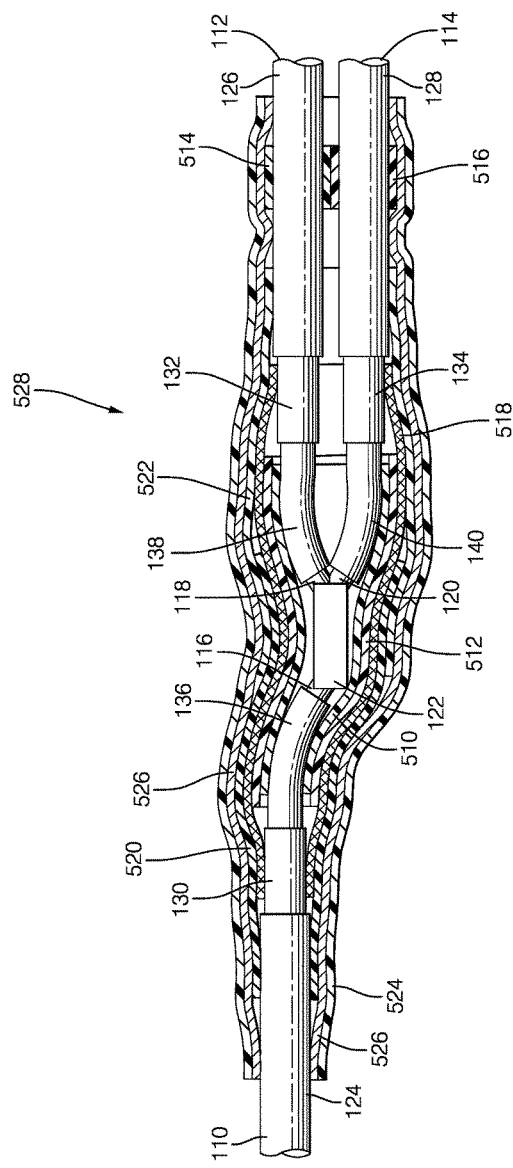
FIG. 36 is a cross section view of the wire harness assembly of FIG. 35 in accordance with the third embodiment.

STEP 428, WRAP A SECTION OF DUAL WALL HEAT SHRINK TUBING OVER THE FLEXIBLE CONDUCTIVE LAYER, includes wrapping a section of dual wall heat shrink tubing 524 over at least the flexible conductive layer 518 and a portion of the outer insulation layers 124, 126, 128 of the first, second, and third shielded wire cables 110, 112, 114 as shown in FIG. 35. Dual wall heat shrink tubing 524 has an outer wall made of a heat shrinkable plastic such as polyolefin and an inner wall made of a thermoplastic adhesive sealant 526. When the dual wall heat shrink tubing 524 is heated, the thermoplastic adhesive sealant 526 on the inner wall melts and adheres to the outer insulation layers 124, 126, 128 as the outer wall shrinks to conform to the shielded cables 110, 112, 114 and flexible conductive layer 518, thus forming a sealed shielded wire cable splice 528. A portion of the sealant 526 may extrude from the dual wall heat shrink tubing 524 as the outer wall shrinks. The dual wall heat shrink tubing 524 may also be wrapped about the third and fourth flexible insulation layers 520, 522 as well as the first and second ferrules 514, 516, thus sealing these features within the dual wall heat shrink tubing 524 when heated. The first and second ferrules 514, 516 provide a gap between the outer insulation layers 126, 128 of the second and third shielded wire cables 112, 114 that is filled by the sealant 526, blocking a possible leak path between the second and third shielded wire cables 112, 114.

While the method 400 shown in FIG. 28 and the sealed shielded wire cable splice 528 shown in FIG. 35 include three shielded wire cables 110, 112, 114, other embodiments of the method 400 and the sealed shielded wire cable splice 528 may be envisioned having two shielded wire cables or more than three shielded wire cables. Ferrules may be wrapped about the outer insulation layers of each shielded wire cable that is adjacent to another shielded wire cable to provide a gap that is filled by the adhesive sealant 526 of the dual wall heat shrink tubing 524.

Accordingly, a shielded wire cable splice 528 and a method of splicing a plurality of shielded wire cables 400 are provided. The method 400 provides a shielded wire cable splice 528 that is sealed from environmental contamination. The shielded wire cable splice 528 and the method 400 do not use solder to join the flexible conductive layer 518 to the shield conductors 130, 132, 134. That allows the method 400 form the shielded wire cable splice 528 by heating the flexible insulation layers and the dual wall heat shrink tubing 524 to a lower temperature than would be required to reflow solder as required by prior art methods described in the Background of the Invention above. The lower heat used provides the advantage of reducing the likelihood of damage to the shielded wire cables 110, 112, 114 from the application of heat. When the core conductors 116, 118, 120 of the shielded wire cables 110, 112, 114 are joined using a sonic welding process, the use of solder is completely eliminated from the method 400 and the shielded wire cable splice 528. The elimination of solder obviates the need for environmental precaution needed with the use of solder. Without subscribing to any particular theory of operation, the compressive contact of the third and fourth flexible insulation layers 520, 522 and/or the dual wall heat shrink tubing 524 with the flexible conductive layer 518 keeps the flexible conductive layer 518 in contact with the shield conductors 130, 132, 134, thereby providing a reliable electrical connection between the flexible conductive layer 518 and the shield conductors 130, 132, 134.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A wire harness assembly, comprising:
a first shielded wire cable having a first core conductor at least partially axially surrounded by a first shield conductor which is at least partially axially surrounded by a first insulative jacket;
a second shielded wire cable having a second core conductor at least partially axially surrounded by a second shield conductor which is at least partially axially surrounded by a second insulative jacket;
a third shielded wire cable having a third core conductor at least partially axially surrounded by a third shield conductor which is at least partially axially surrounded by a third insulative jacket, wherein the first core conductor is electrically and mechanically coupled to the second core conductor and the third core conductor;
a first flexible insulative layer overlaying the joined first, second, and third core conductors;
a second flexible insulative layer overlaying the first flexible insulative layer;
a flexible conductive layer overlaying the first, second, and third shield conductors;
a third flexible insulative layer overlaying a portion of the first flexible insulative layer and a first portion of the flexible conductive layer;
a fourth flexible insulative layer overlaying a portion of the second and third flexible insulative layer and a second portion of the flexible conductive layer; and
a section of dual wall heat shrink tubing in which the third and fourth flexible insulative layers and portions of the first, second, and third insulative jackets are disposed.

2. The wire harness assembly according to claim 1, wherein the flexible conductive layer is formed of braided strands.

3. The wire harness assembly according to claim 1, further comprising: a first ferrule overlaying the second insulative jacket; and a second ferrule overlaying the third insulative jacket and adjacent the first ferrule, wherein the first and second ferrules are also disposed within the section of dual wall heat shrink tubing.

4. The wire harness assembly according to claim 3, wherein the second, third, and fourth flexible insulative layer and the first and second ferrules are formed of a section of heat shrink tubing, the first flexible insulative layer is formed of a cloth tape, and the flexible conductive layer is formed of braided strands.

* * * * *